US011962663B1

(12) United States Patent
Threlkeld et al.

(10) Patent No.: US 11,962,663 B1
(45) Date of Patent: Apr. 16, 2024

(54) SERVER-SPECIFIED FILTERS FOR LONG-LIVED CLIENT REQUESTS TO FETCH DATA IN RESPONSE TO EVENTS

(71) Applicant: Amazon Technologies, Inc., Seattle, WA (US)

(72) Inventors: Richard Threlkeld, Seattle, WA (US); Yash H Patel, Redmond, WA (US); Michael Paris, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 17/697,777

(22) Filed: Mar. 17, 2022

(51) Int. Cl.
*G06F 15/16* (2006.01)
*G06F 9/54* (2006.01)
*G06F 16/242* (2019.01)
*G06F 16/2455* (2019.01)
*H04L 67/133* (2022.01)
*H04L 67/55* (2022.01)

(52) U.S. Cl.
CPC .............. *H04L 67/55* (2022.05); *G06F 9/542* (2013.01); *G06F 16/2448* (2019.01); *G06F 16/24568* (2019.01); *H04L 67/133* (2022.05)

(58) Field of Classification Search
CPC ... H04L 67/55; H04L 67/133; G06F 16/2448; G06F 16/24568; G06F 9/542
USPC ................. 709/203, 217, 219, 226
See application file for complete search history.

(56) References Cited

U.S. PATENT DOCUMENTS

| | | | | |
|---|---|---|---|---|
| 6,438,618 B1* | 8/2002 | Lortz | ...................... | G06F 9/542 |
| | | | | 719/318 |
| 7,421,492 B1* | 9/2008 | Malnati | ................... | H04L 41/06 |
| | | | | 709/224 |
| 9,219,736 B1* | 12/2015 | Lewis | ..................... | H04L 67/53 |
| 10,089,142 B2 | 10/2018 | Plattner et al. | | |
| 10,656,966 B1 | 5/2020 | Grubin | | |

(Continued)

OTHER PUBLICATIONS

Aguilera et al., "Matching Events in a Content-based Subscription System", PODC '99: Proceedings of the Eighteenth Annual ACM Symposium on Principles of Distributed Computing, May 1999, pp. 53-61.

(Continued)

*Primary Examiner* — Liang Che A Wang
(74) *Attorney, Agent, or Firm* — Nicholson De Vos; WEBSTER & ELLIOTT LLP

(57) ABSTRACT

Server-specified subscription filters for long-lived client requests to fetch data in response to events. In one aspect, the techniques encompass a method performed by a set of one or more computing devices. The method includes the step of receiving a long-lived request to fetch data in response to events sent by a client computing device. The method further includes receiving a server-specified subscription filter for the long-lived request and executing the long-lived request. Executing the long-lived request includes creating a persistent function that uses the server-specified subscription filter to map a source event stream to a response event stream. The response event stream is provided to the client computing device. The server-specified subscription filter facilitates filtering of events fetched for the long-lived request in a way that may not be possible or impractical if the subscription client were required to specify the filter in the long-lived request.

20 Claims, 10 Drawing Sheets

(56) References Cited

U.S. PATENT DOCUMENTS

| | | | |
|---|---|---|---|
| 2004/0122892 A1* | 6/2004 | Brittenham | G06F 9/542 709/238 |
| 2005/0022188 A1 | 1/2005 | Tameshige et al. | |
| 2005/0192937 A1 | 9/2005 | Barsness et al. | |
| 2009/0282272 A1 | 11/2009 | Bestgen et al. | |
| 2015/0039586 A1 | 2/2015 | Kerschbaum et al. | |
| 2015/0341300 A1* | 11/2015 | Swain | H04L 51/42 707/738 |
| 2019/0361916 A1 | 11/2019 | Weaver et al. | |
| 2020/0004730 A1* | 1/2020 | Brown | G06F 16/248 |
| 2020/0192706 A1 | 6/2020 | Huus et al. | |
| 2020/0412760 A1 | 12/2020 | Luo et al. | |
| 2021/0306217 A1 | 9/2021 | Paiva et al. | |

OTHER PUBLICATIONS

Bagchi, Saurabh, "Content-based Publish-Subscribe Middleware", Gryphon, Purdue Engineering, Jan. 26, 2003, 3 pages.

Fette et al., "The WebSocket Protocol", Internet Engineering Task Force (IETF), Request for Comments: 6455, Dec. 2011, 71 pages.

Github, "RFC: AppSync Enhanced Subscriptions Filtering #186", Available Online at <https://github.com/aws/aws-appsync-community/issues/186>, Nov. 8, 2021, pp. 1-26.

graphql.org, "GraphQL", Oct. 2021 Edition, Available Online at <https://spec.graphql.org/October2021/>, Oct. 2021, 174 pages.

Jacobsen, Hans-Arno, "Publish/Subscribe", Bell University Laboratory Chair in Software Engineering, Middleware Systems Research Group, University of Toronto, Available Online at <https://www.eecg.utoronto.ca/~jacobsen/courses/ece1770/slides/ps.pdf>, Mar. 2, 2007, 46 pages.

Kale et al., "Analysis and Algorithms for Content-based Event Matching", 25th IEEE International Conference on Distributed Computing Systems Workshops, Jun. 2005, 7 pages.

Doyle, Joseph, "Load Balancing and Rate Limiting based Algorithms for Improving Cloud Computing Performance", University of Dublin, Trinity College School of Computer Science and Statistics, Sep. 2012, 149 pages.

Non-Final Office Action, U.S. Appl. No. 17/703,743, dated May 4, 2023, 28 pages.

Stack Overflow, "How to Construct an Abstract Syntax Tree", Available Online at <https://stackoverflow.com/questions/1721553/how-to-construct-an-abstract-syntax-tree>, Retrieved on Apr. 29, 2023, 2018, 5 pages.

Final Office Action, U.S. Appl. No. 17/703,743, dated Oct. 12, 2023, 27 pages.

Notice of Allowance, U.S. Appl. No. 17/850,962, dated Aug. 16, 2023, 12 pages.

* cited by examiner

PREDICATE OPERATORS 300

| OPERATOR | DESCRIPTION |
|---|---|
| EQ | EQUAL |
| NE | NOT EQUAL |
| LE | LESS THAN OR EQUAL |
| LT | LESS THAN |
| GE | GREATER THAN OR EQUAL |
| GT | GREATER THAN |
| CONTAINS | CHEKS FOR A SUBSEQUENCE OR A VALUE IN A SET |
| NOTCONTAINS | CHECK FOR THE ABSENCE OF A SUBSEQUENCE OR A VALUE IN A SET |
| BEGINSWITH | CHECKS FOR A PREFIX |
| IN | CHECKS FOR MATCHING ELEMENTS IN A LIST |
| NOTIN | CHECKS FOR MATCHING ELEMENTS NOT IN A LIST |
| BETWEEN | BETWEEN TWO VALUES |

FIG. 3

SERVER-SPECIFIED FILTERS FOR LONG-LIVED CLIENT REQUESTS TO FETCH DATA IN RESPONSE TO EVENTS

BACKGROUND

A provider network (or "cloud" provider network) provides a user with the ability to use a computing-related resource such as a compute resource (e.g., executing a virtual machine (VM) instance or container, executing a batch job, executing code without provisioning a server), a data/storage resource (e.g., object storage, block-level storage, data archival storage, a database, a database table, etc.), a network-related resource (e.g., configuring a virtual network, a content delivery network (CDN), a Domain Name Service (DNS)), an application resources (e.g., a database, an application build or deployment service), an access policy or role, an identity policy or role, a machine image, a router or other data processing resource, etc. A computing resource can be provided by the provider network as a service, such as a hardware virtualization service that can execute a compute instance, a storage service that can store a data object, etc.

A user (or "customer") of the provider network can use a user account (or "customer account") to access a service provided by the provider network. A user can interact with the provider network across an intermediate network (e.g., the Internet) via an interface, such as through use of an application programming interface (API) call, via a console implemented as a website or an application, etc.

An API refers to an interface or communication protocol between a client computing device (e.g., a client computing device of a user) and a server computing device in the provider network, such that if the client computing device makes a request in a predefined format, the client computing device should receive a response in a specific format or initiate a defined action. In the provider network context, an API provides a gateway for the client computing device to access provider network infrastructure by allowing the client computing device to obtain data from or cause actions within the provider network, enabling the development of applications that interact with resources and services hosted in the cloud provider network. An API can also a service of the cloud provider network to exchange data with another service of the provider network.

One type of request that a client may make of some APIs is a long-lived request to fetch data in response to events. This request is also referred to as a subscription request or just a "subscription." A subscription request can specify criterion for determining events that are responsive to the request. This criterion is also referred to as a subscription filter. Subscriptions are useful for notifying a client application in real-time about mutations to server-side data.

BRIEF DESCRIPTION OF DRAWINGS

Various embodiments in accordance with the present disclosure will be described with reference to the drawings, in which:

FIG. 3 depicts a table of predicate operators for use in a server-specified filter, according to some embodiments.

DETAILED DESCRIPTION

Figure 1:
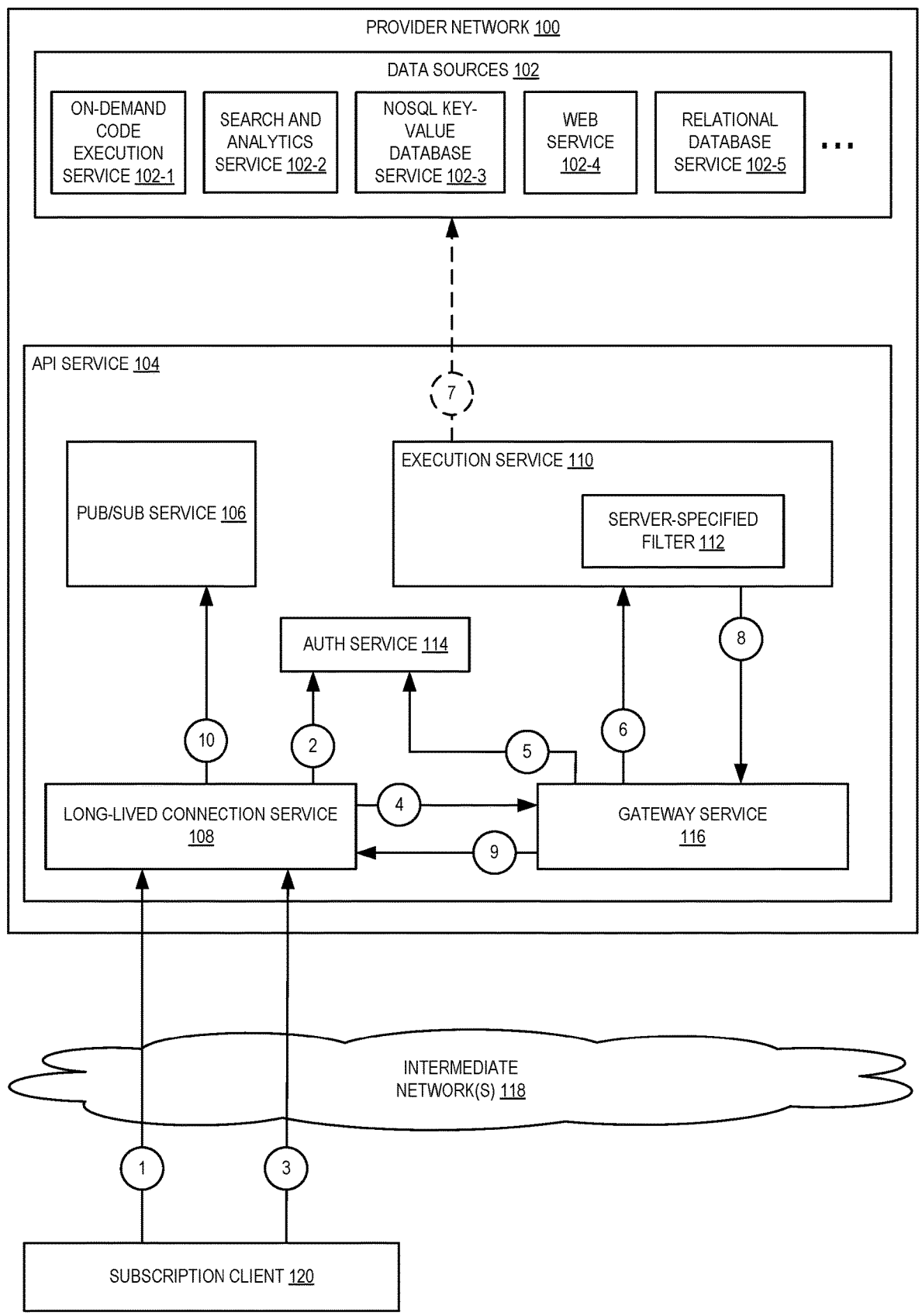
FIG. 1 illustrates an example environment in which steps of a method are performed for specifying a filter at a server for a subscription request, according to some embodiments.

Techniques for server-specified filters for long-lived client requests to fetch data in response to events (subscriptions) are disclosed. In one aspect, the techniques encompass a method performed by a set of one or more computing devices. The method includes the step of receiving a long-lived request to fetch data in response to events (a subscription request) sent by a client computing device. The method further includes receiving a server-specified filter for the subscription request and executing the subscription request. Executing the subscription request includes creating a persistent function that uses the server-specified filter to map a source event stream to a response event stream. The response event stream is provided to the client computing device.

As well as a method, the techniques can also be implemented as a system. The system includes a set of one or more computing devices and has instructions which when executed cause performance of the method. The techniques can additionally be implemented as a non-transitory storage medium storing instructions which when executed by a set of one or more computing devices cause performance of the method.

The techniques herein use a server-specified filter to map a source event stream to a response event stream in the context of a subscription request. The response event stream is provided to a client computing device that makes the subscription request. The server-specified filter can be composed of complex filtering criterion in the form of a group of one or more predicates. In mapping the source event stream to the response event stream, the group of predicates are applied to events from the source event stream to determine which events to include in the response event stream. A group of multiple predicates can be related in the conjunctive or the disjunctive. The predicates themselves can be composed of various relational operators such as, equal, not equal, less than or equal, less than, greater than or equal, greater than, etc.

As used herein, a "server-specified subscription filter", or just "server-specified filter," for a subscription request encompasses a subscription filter that is not entirely specified in the subscription request at the subscription client that sends the subscription request to a server for execution. For example, one or more fields, operators, or values of one or more predicates of a server-specified subscription filter can originate at a sever that executes the subscription request sent from a client (subscription client).

The techniques allow for complex subscriptions. An example of a complex subscription might be, in loose terms, including an event from the source event stream in the response event stream when a field of the event is one of specified set of alternative values. For example, consider a client application used by a customer technical support technician. Suppose the technical support technician is responsible for handling electronic customer support requests for widget A, widget B, and widget C. Using the techniques herein, the client application can make a long-lived request to fetch customer support ticket data in response to customer support ticket creation events. A server-specified filter can be used to map only customer support ticket creation events pertaining to any of widget A, widget B, or widget C to the response event stream provided to the client application used by the technician. This is just one example of many possible complex subscriptions that are facilitated by the techniques herein.

In addition, the techniques alleviate the client application from making all subscription filtering decisions. This is useful if the subscription filter is based on sensitive information that should not be accessed or that is not readily accessed by the client application such as, for example, personally identifiable information (PII), encrypted information, or other sensitive or protected information. As an example, consider a client application that uses JavaScript Object Notation (JSON) Web Tokens for authorization. JSON Web Tokens are a compact and Uniform Resource Locator (URL)-safe means of representing claims to be transferred between two parties. The claims are encoded as a JSON object that is used as the payload of a JSON Web Signature structure or as the plaintext of a JSON Web Encryption (JWE) structure, thereby enabling the claims to be digitally signed or integrity protected with a Message Authentication Code (MAC) or encrypted. It can be useful to use a value encoded in a JSON Web Token in a subscription filter. For example, the value might be a user identifier or other value that is useful to use in a subscription filter. However, if the JSON Web Token is encrypted and the encryption key is not available to the client application for security reasons, then the client application is unable to use the encoded value in a client-specified subscription filter. On the other hand, the encryption key can be available to the server that encrypted the JSON Web Token. In this case, the server can decrypt the encrypted JSON Web Token sent from the client application in a subscription request, access the value from the decrypted JSON Web Token, and use the value in a server-specified filter for the subscription request.

Other related technical benefits of server-specified filters for subscriptions include simplifying client application logic and facilitating the use of subscription filters that are generated based on information that is accessible only on the server-side of a client-server application or that is more easily or more readily accessed on the server-side. These and other beneficial aspects of the techniques will now be described with respect to the figures.

Figure 2:
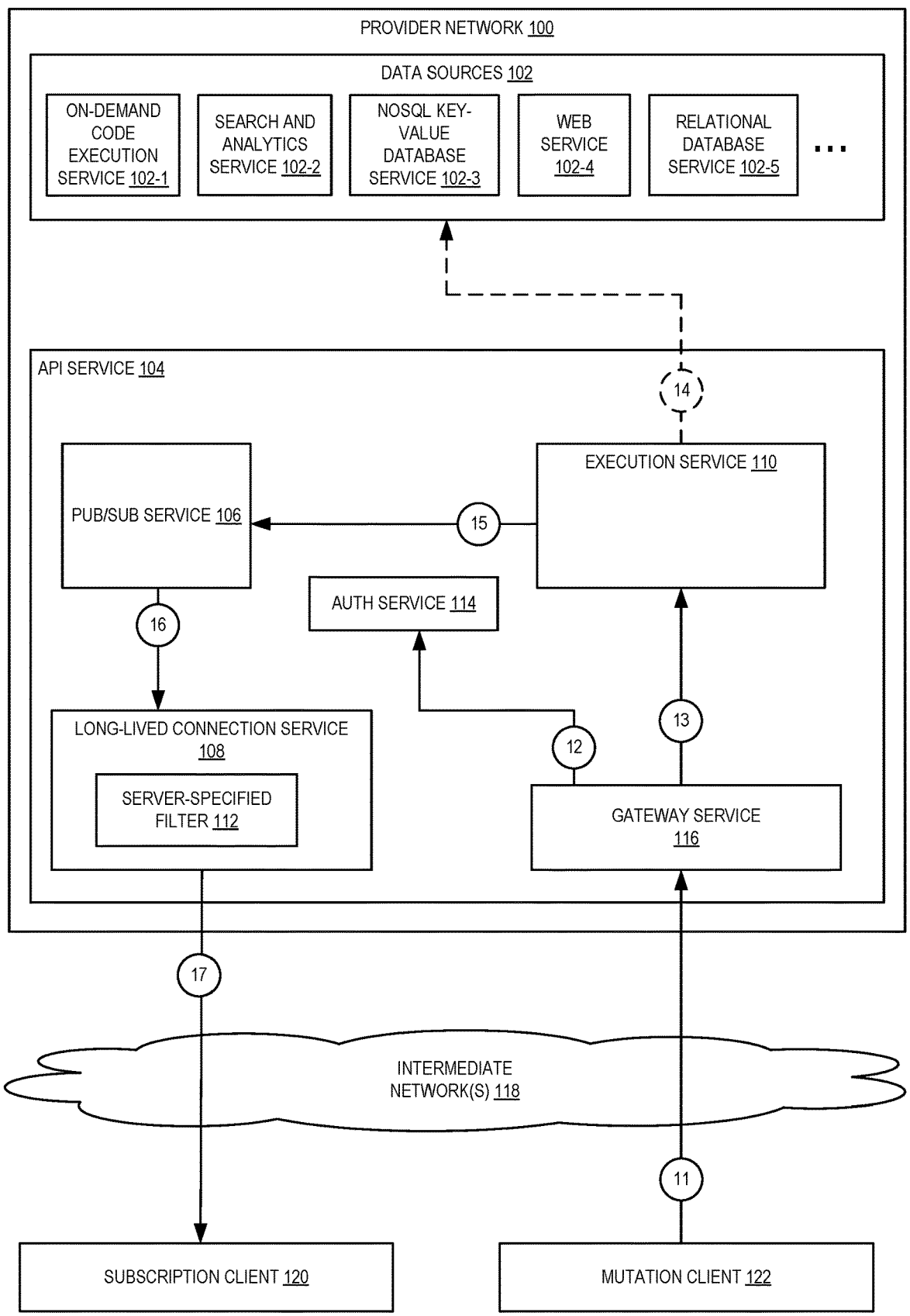
FIG. 2 illustrates the example environment of FIG. 1 in which steps of a method are performed for using the server-specified filter to publish a mutation event that is responsive to the subscription request, according to some embodiments.

FIG. 1 illustrates an example environment in which steps of a method for specifying a filter at a server for a subscription request is performed, according to some embodiments. FIG. 2 illustrates the environment of FIG. 1 in which steps of a method for using the server-specified filter to publish a mutation event that is responsive to the subscription request is performed, according to some embodiments. The steps of the methods are depicted in FIG. 1 and FIG. 2 as numbered circles. While the steps can be performed in the order depicted, it will be appreciated that some steps can be performed concurrently, in a different order, or omitted altogether, depending on the requirements of the particular implementation at hand. The arrows in FIG. 1 and FIG. 2 depict a direction of data flow but not necessarily the exclusive direction.

At a high level, the method for specifying a filter at server for a subscription request proceeds by subscription client 120 at Step 1 initiating establishment over intermediate network(s) 118 of a bi-directional data communications channel with long-lived connection service 108 of API service 104 in provider network 100. At Step 2, long-lived connection service 108 communicates with auth service 114 of API service 104 to authorize establishment of the bi-directional data communications channel with subscription client 120. At Step 3, subscription client 120 sends a long-lived request to fetch data in response to events (i.e., a subscription request) over the authorized bi-directional data communications channel to long-lived connection service 108. At Step 4, long-lived connected service 108 forwards the subscription request to gateway service 118 of API service 104. At Step 5, gateway service 118 communicates with auth service 114 to authorize the subscription request. At Step 6, gateway service 118 sends the authorized subscription request to execution service 110 of API server 104 for execution. Execution service 110 executes the subscription request which causes execution service 110 to receive server-specified filter 112. Optionally, at Step 7, execution of the subscription request by execution service 110 can include fetching data from one or more data sources 102 such as, for example, data that is used to create server-specified filter 112. At Step 8, execution service 110 provides server-specified filter 112 to gateway service 116. Gateway service 116, in turn Step 9, provides server-specified filter 112 to long-lived connection service 108. Long-lived connection service 108 creates a persistent function for using server-specified filter 112 to map a source event stream provided by publish/subscription (pub/sub) service 106 to a response event stream that is provided to subscription client 120 over the bi-directional data communications channel. At Step 10, long-lived connection service 108 subscribes to a channel of pub/sub service 106 that contains the source event stream.

Continuing the high-level discussion now with reference to FIG. 2, the method for using server-specified filter 112 to publish to subscription client 120 a mutation event that is responsive to the subscription request proceeds with Step 11 where mutation client 122 sends a mutation request to gateway service 116 over intermediate network(s) 118. At Step 12, gateway service 116 communicates with auth service 114 to authorize the mutation request. At Step 13, the mutation request is sent to execution service 110 for execution. Optionally, at Step 14, execution of the mutation request by execution service 110 can update data in one or more data sources 102. At Step 15, execution service 110 publishes a mutation event representing the result of executing the mutation request to the channel at pub/sub service 106 providing the source event stream. At Step 16, long-lived connection service 108 receives the mutation event from pub/sub service 106 as a subscriber to the channel that provides the source event stream. Long-lived connection service 108 executes the persistent function which applies server-specified filter 112 to the mutation event to determine whether the mutation event should be included in the response event stream provided to subscription client 120. If so, then, at Step 17, the mutation event is provided to subscription client 120 over the bi-directional data communications channel as a response to the subscription request.

For purposes of providing a clear example, FIG. 1 depicts just a single subscription request from one subscription client using a single server-specified filter, one bi-directional data communications channel, and a single pub/sub channel. Likewise, FIG. 2 depicts just a single mutation client and involves just a single mutation event. However, in a practical implementation, the environment of FIG. 1 and FIG. 2 can involve processing, including concurrent processing, of many subscription requests from many subscription clients and involve many bi-directional data communications channels, many server-specified filters, many mutation clients, many mutation events, and many pub/sub channels.

As an example, the bi-directional data communication channel initiated by subscription client 120 at Step 1 can be a WebSocket connection or other Transmission Control Protocol (TCP)-based connection. The subscription request at Step 3 can be a GraphQL request specifying a subscription operation or other API query language request specifying a subscription operation. The mutation request at Step 11 can be a GraphQL request specifying a mutation operation or other API query language request specifying a mutation operation. Thus, the techniques can be implemented to support server-specified filters for GraphQL subscriptions or other API query language subscriptions.

Many of the examples herein involve the GraphQL API standard, a current specification of which can be found on the internet at /October2021 in the spec.graphql.org internet domain. However, the techniques are not limited to GraphQL and the techniques can be applied to API requests to execute operations that conform to other API query languages including, but not limited to, the REpresentational State Transfer (REST) API query language or other API query language that conforms to an interface or communication protocol between a client computing device (e.g., a client computing device of a user) and a server computing device, such that if the client computing device makes a request to execute an operation in a format that accords with the interface or communication protocol, the client computing device should receive a response in a specific format or cause execution of the operation to be initiated.

Before discussing the techniques in greater detail, some discussion of various components in the example environment of FIG. 1 and FIG. 2 is provided.

Provider network 100 is programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over one or more intermediate network(s) 118 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability is provided to a user using the provider's software applications running on the infrastructure of provider network 100. The applications can be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the user does not manage or control the underlying infrastructure including network, servers, operating systems, storage, or individual application capabilities, except for limited user-specific application configuration settings. With PaaS, the user is provided the capability to deploy onto hardware and software infrastructure of provider network 100 user-created or acquired applications using programming languages, libraries, services, and tools supported by the provider or other sources.

Typically, under the PaaS model, the user does not manage or control the underlying hardware and software infrastructure including network, servers, operating systems, or storage, but has control over the deployed applications and possibly configuration settings for the application-hosting environment.

With IaaS, the user is provided the capability to provision processing, storage, networks, and other fundamental computing resources where the user can deploy and run arbitrary software, which can include operating systems and applications. The user does not manage or control the underlying hardware and software infrastructure but has control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 is provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 is provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure is provisioned for open use by the public. The public cloud can be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100 (e.g., via on-demand code execution service 102-1), which in turn uses one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 118 (e.g., the internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Data sources 102 are programmed or configured to provide services in provider network 100. Data sources 102 offer APIs to execution service 110 for accessing the services. Execution service 110 can access data sources 102 to fetch (retrieve) data from data sources 102 in response to subscription requests or to mutate (change) data managed by data sources 102 in response to mutation requests. The APIs offered by data sources 102 to API service 104 can also be offered to other services in provider network 100 and to users over intermediate network(s) 118.

Data sources 102 can include different types. However, no particular type of data source is required. In the example of FIG. 1 and FIG. 2, data sources 102 include on-demand code execution search 102-1, search and analytics service 102-2, NOSQL key-value database service 102-3, web service 102-4, and relational database service 102-5, among other possible types of services.

While data sources 102 are depicted in FIG. 1 within provider network 100, some or all of data sources 102 can be located external to provider network 100 such as, for example, located in one or more other provider networks that are accessible via intermediate network(s) 118. While multiple data sources 102 are depicted in the environment of FIG. 1, the environment can have as a few as one data source or more data sources than depicted. On-demand execution service 102-1 is configured or programmed to provide an event-driven, serverless computing service and offer an API for accessing and using the service. Service 102-1 can run code in response to events. Service 102-1 can be programmed or configured to automatically manage the computing resources required by the executed code. Execution of the code can be triggered by an event such as an API call, a sensor output, or message passing from other code executed by service 102-1. "Serverless" computing refers to a cloud computing execution model in which provider network 100 allocates machine resources on demand taking care of the servers on behalf of users. While execution of code by service 102-1 is not strictly serverless, developers of the code need not be concerned with capacity planning, configuration, management, maintenance, fault tolerance, or scaling of execution containers of the code by service 102-1. Serverless computing might not hold resources in volatile memory when code is not being executed. Instead, computing by service 102-1 can be accomplished in short bursts and on-demand (in response to events) with results persisted to storage. When code is not being executed, computing resources of service 102-1 might not be allocated to the code.

Search and analytics service 102-2 is configured or programmed to provide search and analytics services and an API for accessing the service. Service 102-2 can support various use cases such as log analytics, real-time application monitoring, and clickstream analysis.

NOSQL key-value database service 102-3 is configured or programmed provide a NOSQL database service and offer an API for accessing the service. The NOSQL database service can support key-value and document data structures. A key-value pair (also known as a name-value pair, attribute-value pair, or field-value pair) is a fundamental data representation in computing systems and applications. A database managed by service 102-3 can conform to a data model expressed as a collection of 2-tuples in the form <key, value> with each element being a key-value pair.

Web service 102-4 is configured or programmed to respond to HTTP requests with HTTP responses.

Relational database service 102-5 is configured or programmed to provide a distributed relational database management service and offer an API for accessing the service (e.g., using the Structured Query Language (SQL)).

API service 104 is configured or programmed to provide an API query language interface for client-server applications. An application developer can use API service 104 to program or configure an application API for a client-server application such as, for example, a web or mobile application. API service 104 can be viewed as a managed service where an application developer programs or configures their application API with API service 104. API service 104 takes care of processing and responding to requests via the API query language interface in accordance with the specified application API. In this way, a separation of concerns is achieved where the application developer is freed to focus on the design of the application API with less concern about implementing and operating and providing the computing resources for the API query language interface that supports execution of the application API.

In an embodiment, API service 104 supports the GraphQL API query language. GraphQL is a query language designed to build client-server applications by providing an intuitive and flexible syntax and system for describing data requirements and interactions of the applications. A client computing device (e.g., subscription client 120 or mutation client 122) can use the query language to make requests of application APIs supported or hosted by API service 104. A request can contain an operation such as a query, mutation, or subscription. A request can be defined as a syntactic grammar in which terminal symbols are tokens. The tokens are defined in a lexical grammar which matches patterns of permitted source characters (e.g., UNICODE code points U+0009, U+000A, U+000D, and U+0020 through U+FFFF). A request can be composed of a sequence of permitted source characters.

As mentioned, an API query language request can specify a query, mutation, or subscription operation to be executed. A query can be a read-only fetch operation. A mutation can be a write operation followed by a fetch operation. A subscription can be a long-lived request that fetches data in response to source events. Regardless of operation type, each type of operation can be specified in a request by an optional operation name and a selection set. A selection set is a set of one or more selections where a selection can be a field. A field describes a discrete piece of information available to request within a selection set. A field can itself contain a selection set to form nested or deeply nested requests. Ultimately, a query, mutation, or subscription operation can specify their selections down to fields which return scalar values to ensure an unambiguously shaped operation result of the operation.

The following is an example of an API query language request containing a subscription operation that might be sent by subscription client 120 and received by long-lived connection service 108, as in Step 3 of FIG. 1, for example. In the example, the keyword "subscription" is used in Line 00 to distinguish the operation from a query operation and a mutation operation.

```
00: subscription NewMessages {
01:   newMessage(roomId: 123) {
02:     sender
03:     text
04:   }
05: }
```

The above-example subscription operation subscribes to new messages posted to a chat room with identifier "123". While subscription client 120 is subscribed, whenever new messages are posted to chat room with ID "123", the fields "sender" and "text" of the new message will be resolved by API service 104 and published to subscription client 120, as in Step 17 of FIG. 2, for example.

For example, in response to mutation client 122 posting a new message to chat room "123", subscription client 120 might receive the following event in the response event stream provided to subscription client 120:

```
{
  "data": {
    "newMessage": {
      "sender": "Davis Ghosh"
      "text": "Did you finish that TPS report?"
    }
  }
}
```

In the above example, a server-specified filter might not be used. For example, pub/sub service 106 might be configured with a channel for each chat room where the identifier of the chat room identifies the corresponding channel. In this case, a server-specified filter might not be needed to map a source event stream provided by a channel of pub/sub service 106 to the response event stream provided to subscription client 120 as the chat room identifier specified in the subscription request is sufficient to perform the mapping from the source event stream to the response event stream. However, a server-specified filter can be used if additional subscription filtering is desired. For example, a server-specified filter might be used to filter new message events provided to subscription client 120 so that only such events corresponding to new messages posted by a specified sender or any sender in a specified set of senders are included in the response event stream. How such subscription filtering can be accomplished using server-specified filters is described in greater detail elsewhere herein.

The following is an example of an API query language request containing a mutation operation that might be sent by mutation client 122 and received by gateway service 116, as in Step 11 of FIG. 2, for example. In this example, the "likeCount" field is a field of a selection set nested within the "story" field which is a field of a selection set nested within the "likePost" mutation field which is a field of the top-level selection set. In the example, the keyword "mutation" is used in Line 00 to distinguish the operation from a query operation and a subscription operation.

```
00: mutation {
01:   likePost(postID: 12345) {
02:     story {
03:       likeCount
04:     }
05:   }
06: }
```

The above example mutation operation requests to "like" a post and then fetches the new number of likes. A server-specified filter might be used to receive notification of such events such as, for example, posts that reach a like count of one hundred.

Execution service 110 is programmed or configured to execute operations in API query language requests sent from clients (e.g., subscription client 120 and mutation client 122). For example, execution service 110 can be programmed or configured to execute queries, mutations, and subscription operations. If the operation is a query or a mutation operation, then the operation result of executing the operation by execution service 110 can be the result of executing the operation's top-level selection set. If the operation is a subscription, then the operation result can be a response event stream where each event in the event stream can be the result of executing by execution service 110 the subscription operation, including applying any server-specified filter for the subscription operation, for each new event in an underlying source event stream. Execution of a subscription operation by execution service 110 can create a persistent function on API service 104 that uses a server-specified filter to map the underlying source event stream to a returned response event stream.

Execution service 110 can be programmed or configured to represent a requested operation as an abstract syntax tree according to an API query language schema. The API query language (e.g., GraphQL) can be defined as a syntactic grammar where terminal symbols are tokens. Tokens can be defined in a lexical grammar which matches patterns of source characters. The result of parsing a sequence of source characters of a request by execution service 110 can produce a sequence of lexical tokens according to the lexical grammar. An abstract syntax tree can then be produced by execution service 110 according to the syntactical grammar.

In an embodiment, an application developer defines an API query language schema with API service 104 which determines their application API contract for a client application to communicate with by means of an API query language. For example, the API query language can be GraphQL over the HyperText Transport Protocol (HTTP) as the application network layer transport protocol. As used herein, the term "HTTP" is intended to include cryptographically secured variants commonly referred to as "HTTPS". API service 104 can support and provide an API query language interface for multiple different application APIs as defined by multiple different API query language schemas.

Upon receiving an operation of a request of an application API, execution service 110 can convert the operation to an abstract syntax tree representation according to an API query language schema that defines the application API. Nodes of the abstract syntax tree can be associated by the API query language schema with one or more resolver functions that are executed by execution service 110 to resolve fields to data. A resolver function can be programmed or configured by an application developer of the application API. The attached resolver functions are responsible for resolving fields of the operation to data. A resolver function can resolve a field to data by fetching the data from an external data source or the resolver function can resolve the field to data internally without fetching data from a data source. A field can be resolved to a scalar data type or a collection of scalar data types such as, for example, a string, an integer, a list of strings, a list of integers, a set of strings, a set of integers, a dictionary containing a mix of strings and integers, etc. However, the API service 104 can allow an application developer to define an API query language schema such that a field can be resolved by execution service 110 to one or more instances of a complex data type. The complex data type can be defined in the API query language schema in terms of fields that require further resolving by execution service 110 by executing one or more additional resolver functions. As such, execution service 110 can add new nodes to the abstract syntax tree representation of the operation corresponding to new fields needing to be resolved as the operation is executed by execution service 110 and as data returned from one or more data sources is processed by one or more resolver functions.

In some embodiments, a server-specified filter is specified by a resolver function that is bound to a subscription field. The binding between the resolver function and the subscription field can be defined by an API query language schema for an application API. When execution service 110 receives a subscription request of the application API to execute where the subscription request references the subscription field in a selection set, execution service 110 can use the schema to determine the resolver function bound to the subscription field and then execute the resolver function. The resolver function can be programmed or configured by an application developer of the application API to specify a server-specified filter. This is one way in which API service 104 can receive a server-specified filter.

As mentioned, each application API available at API service 104 can be defined by a respective API query language schema. The API query language schema is used by API service 104 to determine if a requested operation is valid for the respective application API. The API query language schema can define the shape of the data that flows through the application API. The API query language supported by API service 104 can be strongly typed such that API service 104 validates requested operations of the application API against the API query language schema.

Pub/sub service 106 can be a channel-based publish-subscription system and event-driven computing service for asynchronous application-to-application or service-to-service communication. Pub/sub service 106 can support event-driven computing in which "subscriber" services or just "subscribers" automatically perform work in response to events triggered by "publisher" services or just "publishers." In an embodiment, execution service 110 is a publisher of source stream events and long-lived connection service 108 is a subscriber to the source stream events.

Pub/sub service 106 can allow a publisher to publish an event message to a subscriber using message channels or channels. A "channel" is like a message queue in that is an asynchronous service-to-service communication mechanism in which event messages are stored in the channel until they are processed and deleted. However, a channel can differ from a message queue in some ways depending on the type of channel.

In some embodiments, pub/sub service 106 supports at least two different types of channels, either of which can be used in an implementation of the disclosed techniques. The two different types of channels are termed herein "standard" and "FIFO." With a standard channel, event messages can be delivered by pub/sub service 106 to long-lived connection service 108 as a subscriber in a different order than the order in which they were published to the standard channel by execution service 110. In other words, for a standard channel, pub/sub service 106 can make a best effort but not guarantee to deliver event messages in the same order in which they were published to the message channel. Furthermore, with a standard channel, an event message can be delivered more than once to long-lived connection service 108. In other words, for a standard channel, pub/sub service 106 can make a best effort but not guarantee to deliver only one copy of a published event message to long-lived connection service 108. Another type of message channel is a FIFO channel. A FIFO channel is like a standard channel except that first-in-first-out ordering is guaranteed by pub/sub service 106 and event message deduplication within a sliding window of time can be provided by pub/sub service 106.

In some embodiments, each application API supported by API service 104 has its own channel at pub/sub service 106. The channel can be identified by an identifier of the corresponding application API. When a mutation operation for a particular application API is executed by execution service 110, the resulting "mutation" event is published to the channel for the particular application API. When a subscription request for the particular application API is made by a subscription client, long-lived connection service 108 can subscribe to the channel for the particular application API to receive a source event stream composed of events for the particular application API. Long-lived connection service 108 can then apply a server-specified filter received for the subscription request to the source event stream to map (determine which) mutation events in the source event stream are provided to the subscription client in the response event stream provided to the subscription client. In addition to or instead of a channel at pub/sub service 106 per-application API supported by API service 104, there can be a channel per-user account, per-customer account, per-subscription client, per-mutation client, per-group of subscription clients, per-group of mutation clients, or other channel configuration suitable to the requirements of the particular implementation at hand.

Thus, there is no requirement that a channel per-application API be used. In general, however, channel configuration at pub/sub service 106 can provide coarse grained subscription filtering such as in the chat room example above where there is a channel per-chat room at pub/sub service 106, while long-lived connection service 108 can provide additional finer-grained subscription filtering including applying server-specified filters to map source event streams to response event streams. Continuing the chat room example where there is a channel per-chat room at pub/sub service 106, long-lived connection service 108 can apply a server-specified filter to a source event stream for a particular chat room to further filter the events that are mapped to a response event stream for which the server-specified filter is specified.

Long-lived connection service 108 can maintain a pool of bi-directional data communications channels with subscription clients. Each such channel can be based on the Transmission Control Protocol (TCP) or other network protocol that facilitates full-duplex message passing over intermediate network(s) 118 between subscription clients and long-lived connection service 108. In an implementation, a bi-directional data communications channel is a WebSocket complying with proposed internet standard Request for Comments (RFC) 6455. A channel can be established and open for an extended period of time. For example, a channel between a subscription client and long-lived connection service 108 can be established and open indefinitely, until the subscription client or long-lived connection service 108 closes or disconnects from the channel, or after a period of inactivity during which no message data is passed on the channel. The subscription client or long-lived connection service 108 can periodically send a keep-alive message to indicate an intent to keep the channel established and open.

While in some embodiments pub/sub service 106 is a separate service from long-lived connection service 108, pub/sub service 106 is a component of long-lived connection service 108 in other embodiments. For example, as a component of long-lived connection service 108, pub/sub service 106 can be used to map a source event stream to a response event stream for a subscription request in the event a server-specified filter is not specified for a subscription request.

Returning now to Step 1, subscription client 120 sends a handshake request over intermediate network(s) 118 to long-lived connection service 108 to establish a bi-directional data communications channel. At Step 2, long-lived connection service 108 can authenticate or authorize the handshake request by communicating with auth service 114. Auth service 114 can authenticate or authorize the handshake request according to one or more access control mechanisms, frameworks, or protocols including, but not limited to, Identity and Access management (IAM), OpenID Connect (OIDC), a user pool, a user directory, social web sign-in, Security Assertion Markup Language (SAML), authentication or authorization based on on-demand execution service 102-1, API key-based authentication or authorization, etc. If the handshake request is successfully authenticated or authorized by auth service 114, then long-lived connection service 108 returns a handshake response to subscription client 120 indicating that the bi-directional data communications channel is successfully established.

At Step 3, subscription client 120 sends a subscription request to long-lived connection service 108 over the bi-directional data communications channel established in Steps 1 and 2. The subscription request can be of a particular application API supported or hosted by API service 104. The particular API can be invoked at an API endpoint of API service 104. The API endpoint can be reached from subscription client 120 using a Uniform Resource Locator (URL) or Domain Name System (DNS) domain name for the endpoint.

The subscription request can subscribe to a subscription type provided by the API query language schema of the application API. For example, the API query language schema might define the following example subscription type for subscribing to ticket creation events:

00: type Subscription {
01: onTicketCreate(groups: [String], severity: Int): Ticket
02: @subscribe(mutations: ["CreateTicket"])
03: }

In the above-example, the "@subscribe(mutations: ["CreateTicket"])" directive at Line 02 specifies the mutations that trigger the subscription. In this example, the "CreateTicket" mutation type as well as the "Ticket" data type can also be defined by the API query language schema (not shown). The "groups" parameter and the "severity" parameter of the "onTicketCreate" field definition refer to fields of the "Ticket" data type and determine the arguments that can be specified (passed) in a subscription request. To subscribe, the subscription request can reference the "onTicketCreate" subscription field in a selection set of the subscription request. For example, with the above subscription type defined in the API query language schema for the application API, subscription client 120 might send the following subscription request to the application API at Step 3:

00: subscription AppSyncNotifs {
01: onTicketCreate(groups: ["AppSync-GC", "AppSync-MS", "AppSync-ES"]) {
02: id
03: content
04: }

The above-example subscription request subscribes to certain "Ticket" events that result from the "CreateTicket" mutation operation being executed. The subscription requests the value of the "id" field and the value of the "content" field of each "Ticket" event that satisfies the subscription filter of the subscription request. The subscription filter can be entirely specified in the subscription request with no server-specified filter, partially specified in the subscription request with the rest specified server-side, or entirely server-specified. This example is an example of a subscription filter that is partially specified in the subscription request. In particular, the subscription request specifies possible values for the "groups" field of "Ticket" events. However, it should be noted that the example subscription request does not specify how the possible values should be related in the subscription filter. For example, the subscription request does not specify which of the possible values are required to satisfy the subscription filter. For example, the subscription request does not specify if all three possible values are required or if having just one of the possible values is enough to meet the requirements of the subscription filter. A server-specified filter can be used to specify how the possible values in the partially specified subscription filter are related to form a complete subscription filter. For example, a server-specified filter can be used to specify that the subscription filter requires at least one of the possible values.

Here, in this example, the subscription request specifies an argument for the "groups" parameter but not for the "severity" parameter. In some embodiments, where a subscription request does not provide an argument for a parameter allowed by the subscription type such as the "severity" parameter in this example, the lack of argument is interpreted as subscribing to all values of that field. For example, the above-example subscription request does not require any particular value or particular set of values for the "severity" field of a "Ticket" event that satisfies the subscription filter. To distinguish between all values and no value, in some embodiments, where a subscription request provides a NULL value or equivalent for a parameter allowed by the subscription type, the value is interpreted as subscribing to the absence of the corresponding field. For example, if the above-example subscription request specified NULL for the "severity" field, then only "Ticket" events that do not have a value for the "severity" field or a NULL value or the equivalent would satisfy the subscription filter.

At Step 4, long-lived connection service 108 forwards the subscription request received at Step 3 to gateway service 116. At Step 5, gateway service 116 authenticates or authorizes the subscription request by communicating with auth service 114. Auth service 114 can authenticate or authorize the subscription request according to one or more access control mechanisms, frameworks, or protocols including, but not limited to, Identity and Access management (IAM), OpenID Connect (OIDC), a user pool, a user directory, social web sign-in, Security Assertion Markup Language (SAML), authentication or authorization based on on-demand execution service 102-1, API key-based authentication or authorization, etc. If the subscription request is not successfully authenticated or authorized, then gateway service 116 can return a response indicating so to long-lived connection service 108. Long-lived connection service 108 can then forward the authentication or authorization failure to subscription client 120 via the established bi-directional data communications channel. On the other hand, if the subscription request is successfully authenticated or authorized, then, at Step 6, gateway service 116 forwards the subscription request to execution service 110.

In response to receiving the subscription request at Step 6, execution service 110 can execute the subscription request. Executing the subscription request can include receiving server-specified filter 112 for the subscription request. In particular, execution service 110 can execute a resolver function that is bound to a subscription field of the subscription request by an API query language schema. The subscription field can be bound to the resolver function by the API query language schema for the application API as programmed or configured by an application developer.

The resolver function, including server-specified filter 112, can also be programmed or configured by an application developer of the application API. API service 104 can provide an API by which server-specified filter 112 can be specified in the resolver function. Specifically, the API can allow the definition of a filter expression that will be evaluated against events in a source event stream that the subscription might be interested in. If an event satisfies the filter expression, then the event is included in the response event stream for the subscription. If the event does not satisfy the filter expression, then the event is not included in the response event stream for the subscription.

A server-specified filter can be composed of a group of one or more predicates. Each predicate is composed of a field, an operator, and a value. Multiple predicates can be related together in a filter by Boolean operators such as AND (conjunction), OR (disjunction), or NOT (negation). FIG. 3 depicts a table of predicate operators 300 for use in a predicate of a server-specified filter, according to some embodiments. Predicate operators 300 include relational, logical, and conditional and pattern matching operators. The operator column includes example character strings for specifying the operators in a server-specified filter. Alternatives are possible. For example, instead of using "EQ" for the equality operator, "=" or "==" might be used.

For a given predicate specifying a field F, a predicate operator O, and a value V, a value X of the field F of a target event in a source event stream satisfies the predicate if the condition of the predicate is satisfied according to V, O, and X. If the operator O is EQ, then the predicate condition is satisfied if X equals V. If the operator O is NE, then predicate is satisfied if X does not equal V. If the operator O is LE, then the predicate is satisfied if X is less than or equal to V. If the operator O is LT, then the predicate is satisfied if X is less than V. If the operator O is GE, then the predicate is satisfied if X is greater than or equal to V. If the operator O is GT, then the predicate is satisfied if X is greater than V. If the operator O is CONTAINS, then X is a sequence, and the predicate is satisfied if X equals V or X is a subsequence of V. If the operator O is NOTCONTAINS, then X is a sequence, and the predicate is satisfied if X does not equal V and X is not a subsequence of V. If the operator O is BEGINSWITH, then X and V are character sequences (strings), and the predicate condition is satisfied if X matches V or X is a prefix of V. If the operator O is IN, then V is a list of one or more values, and the predicate is satisfied if X in an element in the list V. If the operator O is NOTIN, then V is a list of one or more values, and the predicate is satisfied if X is not an element in the list V. If the operator O is BETWEEN, then V is composed of a high value and a low value, and the predicate condition is satisfied if X is greater than the low value and less than the high value.

In some embodiments, a resolver function that is executed for a subscription field by execution service 110 in response to a subscription request uses data fetched from a data source to create the server-specified filter. Returning to a previous example involving a customer support technician, suppose at Step 3 subscription client 120 sent the following subscription request:

00: subscription {
01: onTicketCreate(severity: 2) {
02: id
03: content
04: }
05: }

By the subscription request alone, and assuming the subscription type definition for "onTicketCreate" in the API query language schema discussed above, the request provides the value "2" for the "severity" argument. Recall that the API query language schema can bind a particular resolver function that is executed by execution service 110 when an "onTicketCreate" subscription request is made. When invoked, the resolver function can create and provide a server-specified filter. As mentioned, the server-specified filter can be created based on data fetched from a data source as well as contextual information available about the subscription request such as, for example, values passed as arguments in the subscription request for parameters of the subscription field such as the value "2" for the "severity" parameter in the above-example subscription request.

For example, the resolver function might use a user identifier of an authenticated user of subscription client 120 from which the subscription request is received at Step 3 to retrieve from key-value database service 102-3 a set of one or more customer support groups that the authenticated user is assigned to support. For example, the set of customer support groups assigned to the authenticated user as specified in key-value database service 102-3 might be "AppSync-GC", "AppSync-MS", and "AppSync-ES." In this example, the server-specified filter might be configured to send "CreateTicket" events to subscription client 120 where the value of "severity" field of the event EQ (equals) "2" and the value of a "group" field of the event is IN the list ["AppSync-GC", "AppSync-MS", "AppSync-ES" ]. As this example illustrates, a unique server-specified filter can be created for a subscription that is based on information uniquely associated with the subscription request such as, for example, the identity of the authenticated user using the subscription client that sent the subscription request.

While a resolver function invoked in response to a subscription request can fetch data from one or more data sources 102 at Step 7, this is not a requirement. Thus, Step 7 is depicted as optional in FIG. 1. For example, the server-specified filter might be hard-coded in (statically defined by) the resolver function.

In an embodiment, to specify a subscription filter in a resolver function for a particular subscription, an application developer programs or configures the resolver function to call a particular API method. Recall that execution service 110 executes the resolver function bound to a subscription field by an API query language schema in response to receiving a subscription request that selects the subscription field in a selection set. For example, consider the customer support technician example again. Suppose there are multiple subscription clients for multiple customer support technicians where each technician is assigned to support a different group of customers as specified in a database table managed by key-value database service 102-3. For example, the database table might have the following rows, columns, and values.

| UserID | Groups |
|--------|--------|
| 123 | ["AppSync-GC", "AppSync-MS", "AppSync-ES"] |
| 456 | ["AppSync-GC"] |

According to this table, user with UserID "123" supports three groups while user with UserID "456" supports just one group. Thus, "CreateTicket" events sent to the subscription client used by user "123" should include those for any one of the three groups assigned to user "123." However, "CreateTicket" events sent to the subscription client used by user "456" should include only those for the one group assigned to user "456." It is possible for each subscription request from each subscription client to specify the group or groups for which "CreateTicket" event notifications are desired. However, this might require providing access to the database table to the subscription clients or otherwise providing access to the group assignment information in the database table to the subscription clients in a way that is not desired, for example, because of security or other concerns. A server-specified filter can be used instead so that the assignment information in the database table need not be provided to the subscription clients. More generally, this example illustrates how a server-specified filter can be created from data that is more easily fetched or that can only be fetched from a data source that is not accessible to a subscription client.

Continuing the example, the API query language schema might define the following subscription type:

00: type subscription {
01: onTicketCreate(severity: Int): Ticket
02: @subscribe(mutations: ["CreateTicket"])
03: }

The resolver function bound to the "onTicketCreate" subscription field above might be programmed or configured, when executed by execution service 110 in response to a subscription request from a subscription client that selects the "onTicketCreate" subscription, to retrieve the value in the "Groups" column in the row of the above database table where the value of the "UserID" column of the row matches the identifier of an authentication user associated with the subscription request. The retrieved value along with the value of the "severity" parameter passed in the subscription request can be used to create a server-specified filter with, for example, two predicates combined conjunctively. For example, if the subscription client for user "123" makes the following subscription request, then the server-specified filter created for the subscription request might be composed of two predicates combined conjunctively. For a given "CreateTicket" event that might satisfy the server-specified filter, one of the two predicates might ask whether the value of the "severity" field of the event equals (EQ) "2" and the other of the two predicates might ask whether the value of a "group" field of the event is matches an element IN the list ["AppSync-GC", "AppSync-MS", "AppSync-ES"].

00: subscription MySubscription {
01: onTicketCreate(severity: 2) {
02: id
03: content
04: }
05: }

Note that in the above subscription request, the criterion for the predicate on the "group" field is not specified in the subscription request. Rather, that criterion is fetched server-side by the resolver function when executed by execution service 110 in response to the subscription request. Thus, this example illustrates how a server-specified filter can be used to avoid having all filtering criteria be available to and specified by subscription clients in subscription requests. Instead, some or all the subscription filtering criteria for a subscription request can be specified server-side using the techniques herein.

At Step 8, execution service 110 returns server-specified filter 112 to gateway service 116 as a response to executing the subscription request received from gateway service 116 at Step 6. Execution service 110 can return other information associated with server-specified filter 112 that is used to map a source event stream to a response event stream using filter 112. This additional information can include an identifier of the application API invoked by the corresponding subscription request ("application API identifier") and an identifier of the subscription field of the application API selected by the subscription request (e.g., "onTicketCreate"). Filter 112 and the additional information can be provided by execution service 110 to gateway service 116 in any convenient data serialization format such as, for example, JavaScript Object Notation (JSON) or the like.

At Step 9, gateway service 116 forwards filter 112 and associated information received from execution service 110 to long-lived connection service 108. Long-lived connection service 108 uses filter 112 to map a source event stream to the response event stream corresponding to the subscription request for which filter 112 is specified. To do the mapping, long-lived connection service 108 creates a persistent function. In an embodiment, a persistent function is created per-subscription field per-application API. Thus, a persistent function can support multiple response event streams and multiple subscription requests. If the persistent function for the subscription field is already created at long-lived connection service 108 at Step 9, then the existing persistent function can be reused for the new subscription request. It should be noted that the multiple response event streams and subscription requests supported by a persistent function for a subscription field can use different server-specified filters. Thus, filter 112 represents just one server-specified filter for one response event stream and corresponding subscription request. Long-lived connection service 108 can duplicate instances of the persistent function across multiple computing devices of long-lived connection service 108 for high availability, redundancy, or scalability purposes.

At a high-level, the persistent function receives events from a source event stream and applies server-specified filter 112 to the events to determine which of the events should be included in which the target response event stream for which server-specified filter 112 is specified. Each event in the source event stream can be composed of a set of one or more fields (attributes) and values. Each event can also be associated with a data type. The "Ticket" data type in some examples herein is an example of an event data type. For example, a "Ticket" event might have fields such as "id", "severity", "group", "content," etc. The persistent function evaluates filter 112 in terms of the field values of an event in the source event stream. If the event in the source event stream satisfies filter 112, then the event can be included in the target response event stream. Including an event in the response event stream can include sending a serialized form (e.g., JSON, XML, etc.) of the event to subscription client 120 over the bi-directional data communications channel established with subscription client 120. The event can be pre-processed or formatted before a version of the event is included in the response event stream. For example, fields of the event that were not requested in the corresponding subscription request can be removed or the event can otherwise be formatted so that it has the same shape of the subscription request in terms of fields of the event requested in the subscription request and fields provided in the response.

Two example types of a persistent function are described below. Server-specified filter 112 can be a collection of one or more predicates that test various fields of an event in the source event stream. Thus, the persistent function is confronted with a matching problem which is how to efficiently determine whether a given event in the source event stream matches filter 112. Described below is a tree-based algorithm that can be used in an implementation of the persistent function at long-lived connection service 108 to solve the matching problem.

The source event stream for the persistent function can be provided by a channel of pub/sub service 106. Execution service 110 can publish mutation events to the channel in response to executing mutation requests pertaining to the channel. The channel at pub/sub service 106 can contain events at various different levels of granularity. For example, the channel can contain all events published for a particular application API, a particular subscription field (e.g., "onTicketCreate"), a particular mutation field (e.g., "CreateTicket"), or at another level of granularity suitable to the requirements of the particular implementation at hand.

At step 9, along with receiving filter 112 from gateway service 116, long-lived connection service 108 can also receive information that indicates the channel at pub/sub service 106 containing the source event stream for filter 112. For example, the information can be an identifier of an application API, an identifier of a subscription field (e.g., "onTicketCreate"), an identifier of a mutation field (e.g., "CreateTicket"), or another channel identifier.

At Step 10, long-lived connection service 108 can communicate with pub/sub service 106 to subscribe to the channel, if not already subscribed to the channel By subscribing to the channel, long-lived connection service 108 receives mutation events published to the channel by execution service 110. As indicated above, a single channel can provide mutation events for multiple subscriptions. For example, a single channel can contain all mutation events for a particular application API hosted by API service 104. In this example, the source event stream can contain mutation events for different subscription fields of the application API and different persistent functions for the different subscription fields at long-lived connection service 108 can each consume mutation events from the same source event stream/channel.

Turning now to FIG. 2, at Step 11, mutation client 122 sends a mutation request to gateway service 116. For example, mutation client 112 might send a mutation request that contains a mutation operation that references the "CreateTicket" mutation field in a selection set. At Step 12, gateway service 116 authenticates or authorizes the mutation request. Auth service 114 can authenticate or authorize the mutation request according to one or more access control mechanisms, frameworks, or protocols including, but not limited to, Identity and Access management (IAM), OpenID Connect (OIDC), a user pool, a user directory, social web sign-in, Security Assertion Markup Language (SAML), authentication or authorization based on on-demand execution service 102-1, API key-based authentication or authorization, etc.

At Step 13, if the mutation request is authenticated or authorized, then gateway service 116 forwards the mutation request to execution service 110 for execution. Execution service 110 executes the mutation request. Execution of the mutation request can involve mutating (changing) data in a data source at optional Step 14. For example, the "CreateTicket" mutation operation can create data representing a new help desk ticket in a data source at Step 14. However, there is no requirement that execution of a mutation request by execution service 110 create or mutate data in a data source.

At Step 15, the result of executing the mutation request is published by execution service 110 to a channel at pub/sub service 106. The result can be in the form of a mutation event object having an event data type (e.g., "Ticket") and composed of a set of one or more field/attribute/key-values. As mentioned, the channel to which the event is published can vary according to the requirements of the particular implementation at hand. For example, the channel can be for an application API, a subscription field (e.g., "onTicketCreate") of an application API, a mutation field (e.g., "CreateField") of an application API, or other channel.

At Step 16, long-lived connection service 108 receives the published mutation event as a subscriber to the channel Long-lived connection service 108 can then apply server-specified filter 112 to the mutation event to determine if the event should be included in the response event stream sent to subscription client 120. If so, then, at Step 17, long-lived connection service 108 publishes or sends s the mutation event or a version thereof to subscription client 120 via the established bi-directional data communications channel.

The above-mentioned matching problem of a persistent function for a subscription field is solved in two phases: a pre-processing phase and a match phase. The pre-processing phase constructs a matching tree from a set of subscriptions. Each subscription corresponds to a server-specified filter that is a Boolean predicate on mutation events from the source event stream. The match phase uses the constructed matching tree to determine which subscriptions, if any, match a given mutation event from the source event stream. All subscription clients that made matching subscriptions can be notified of the mutation event or a version thereof via their respective bi-directional data communications channels.

The matching problem might be solved naively by testing a given mutation event against each filter in the set of server-specified filters. Such a solution has a time complexity that is proportional to the number of filters. However, the number of filters might be very high in a practical implementation such as, for example, on the order of hundreds, thousands, or more. At the same time, mutation events can be provided from the source event stream at a high rate. In this case, using the naïve solution might not scale adequately to a large number of subscriptions to a subscription field or to a high rate of mutation events.

In some embodiments, a matching tree algorithm is used whose time complexity is sub-linear in the number of subscriptions. The algorithm proceeds generally by initially pre-processing a set of subscriptions into a tree data structure that allows for fast matching. Since evaluation of mutation events from the source event stream can need to occur much more frequently than processing subscription requests, the overhead incurred by the pre-processing is outweighed by the fast-matching benefit provided by the pre-processing. In the matching tree data structure, each node is a test on a field, and the edges are results of such tests. Each lower level of the tree is a refinement of the tests performed at higher levels. With such a matching tree, the subscriptions that match a mutation event can be found by starting from the root node. At each node, the test prescribed by the node is performed and the edge consistent with the result of the test is followed either in depth-first or breadth-first order. Edges associated with subscriptions that are visited during the tree traversal are matching subscriptions.

Figure 4:
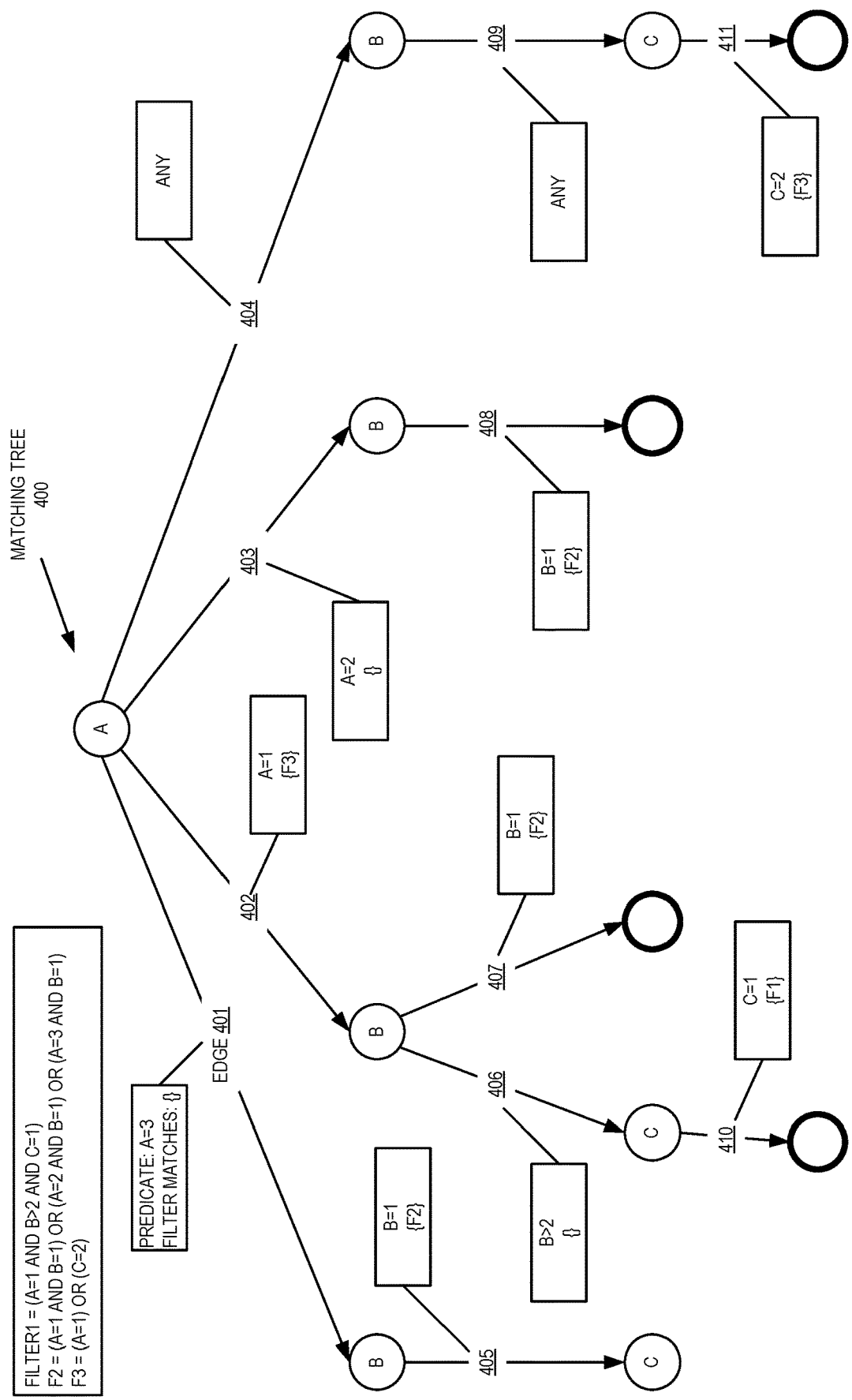
FIG. 4 illustrates a first example matching tree for mapping a source event stream to a response event stream, according to some embodiments.

FIG. 4 illustrates a first example of a matching tree for mapping a source event stream to a response event stream, according to some embodiments. Matching tree 400 is constructed for three server-specified filters F1, F2, and F3. In particular, tree 400 represents the result of the pre-processing phase on filters F1, F2, and F3. Each of the server-specified filters F1, F2, and F3 can correspond to a different subscription request. However, it is possible for different subscription requests to specify the same server-specified filter. In this case, a server-specified filter represented by a matching tree can correspond to more than one subscription request. Thus, while some examples discussed herein assume a one-to-one correspondence between represented server-specified filters and subscription requests, in a practical implementation, a matching tree can represent a server-specified filter that corresponds to many subscription requests. In such a case, where an event from the source event stream satisfies the server-specified filter, long-lived connection service 108 can send the event or a version of the event to each of the corresponding subscription clients.

Matching tree 400 is a N-ary tree for representing server-specified filters for subscription requests. Matching tree 400 can be traversed to find all subscriptions that match an event from a source event stream. Matching tree 400 can be used by long-lived connection service 108 in two aspects. In a first aspect, server-specified filters received from gateway service 116 in response to subscription requests are used to create or update tree 400. In a second aspect, tree 400 is traversed for events in a source event stream to determine which events match a server-specified filter, if any.

Tree 400 represents each server-specified filter F1, F2, and F3 as a set of nodes and edges of tree 400. Each filter F1, F2, and F3 is represented in its disjunctive normal form. Nodes of tree 400 represent the unique fields referenced in the predicates in filters F1, F2, and F3. Edges represent the unique predicates in filters F1, F2, and F3. Edges also represent filter matches, if any, for a corresponding predicate.

All nodes at a given level in tree 400 represent the same field. For example, the root level of tree 400 represents the field A, the second level of tree 400 represents the field B, and the third level of tree 400 represents the field C. Here, the letters A, B, and C are used to generically to represent different fields.

The depth of tree 400 (number of levels) is bounded by the unique number of fields referenced in the filters F1, F2, and F3. This feature bounds the matching time for a given event from the source event stream. The upper bound on the matching time might be no better than the naive approach discussed above. However, the lower bound on the matching time using tree 400 can be lower than the naïve approach.

In some embodiments, an edge of a matching tree connecting a source node to a destination node is traversed for an event only if the edge is an ANY edge or the predicate corresponding to the edge is satisfied by the event. As a simple example, for an event having a single field A equals 2, then only edges 403, 404, and 409 may need to be traversed and only the predicates corresponding to edges 401, 402, 403, 408, and 411 may need to be evaluated. In this example, edges 401, 402, 405, 406, 407, 408, 410, and 411 may not need to be traversed. In some embodiments, if an edge connecting a source node to a destination of a matching tree is not traversed for an event, then the predicates corresponding to the descendant edges of the destination node do not need to be evaluated. Returning to the simple example of an event having a single field A equals 2, the predicates corresponding to edges 405, 406, 407, and 410 may not need to be evaluated.

Tree 400 has edges 401, 402, 403, 404, 405, 406, 407, 408, 409, 410, and 411. Edges 401, 402, 403, 405, 406, 407, 408, 410, and 411 represent the nine unique predicates of filters F1, F2, and F3. For example, edge 402 represents the (A=1) predicate used in filters F1, F2, and F3. As another example, edge 410 represents the (C=1) predicate used in filter F1.

Some of the edges in tree 400 are special edges designated by "ANY". In tree 400, edge 404 and edge 409 are special edges. In some embodiments, such a special edge means "do not care" with respect to the associated field and a filter. For example, filter F3 can be matched by an event if the event has the value 2 for field C regardless of the values the event has for fields A or B (or any other fields). Thus, with respect to filter F3, edges 404 and 409 represent that matching filter F3 (and any other filter associated with edge 411) does not care about fields A or B.

When a server-specified filter for a new subscription to a subscription field arrives at long-lived connection service 108 from gateway service 116 as in Step 9 of FIG. 1, a new matching tree can be created, or an existing matching tree can be updated. A new matching tree can be created if no matching tree for the subscription field exists at long-lived connection service 108. The newly created matching tree can then be updated to represent the filter and the new subscription. If there is an existing matching tree for the subscription field, then the existing matching tree is updated to represent the filter and the new subscription. In the case the filter is already represented by the existing tree, then the edge representing the filter can be updated to indicate the new subscription.

In FIG. 4, both filter F2 and filter F3 are a disjunction of conjunctions (where a single predicate is considered a conjunction). In this case, for purpose of the pre-processing phase, each conjunction of the disjunction can be treated as a separate filter. The original filter is matched if any one of the conjunctions or predicates is matched. Hence, filter F2 is associated with edge 405 representing a match to conjunction (A=1 AND B=1), filter F2 is associated with edge 407 representing a match to conjunction (A=2 and B=1), and filter F2 is associated with edge 408 representing a match to conjunction (A=3 AND B=1). Likewise, filter F3 (A=1) OR (C=2) is associated with edges 402 and 411.

In some embodiments, a filter having a predicate using the IN operator can be treated as a disjunction. For example, consider the server-specified filter (A IN ["FOO", "BAR"]) AND (B=2). Each possible value of the IN predicate can be treated as a separate filter for purpose of the pre-processing phase. For example, this example filter can be treated as first filter (A="FOO") AND (B=2), and as second filter (A="BAR") AND (B=2). Both the first filter and the second filter can be added to a matching tree and separately associated with one or more subscriptions that use the original server-specified filter.

As mentioned, the height of a matching tree can be bounded by the number of unique fields in the filters represented by the matching tree. Thus, the time complexity to add a new filter to the matching tree can also be bounded by the number of unique fields or the height of the matching tree (number of levels of the tree). The space complexity of the matching tree can be a function of the number of fields in the filters represented by the matching tree and the number of unique predicates of the filters for each field.

In some embodiments, limits are placed on server-specified filters. For example, a limit on the number of unique fields used in a server-specified filter can be used to avoid a matching tree from having too many levels (too large of height). Another possible limit might be on server-specified filters that have an IN predicate. For example, there can be a limit on the number of IN predicates or a limit on the number of elements of the list value of an IN predicate. Other limits are possible to bound the time and space complexity of the pre-processing phase. For example, a server-server specified filter can be normalized in disjunctive normal form and there can be a limit on the number of conjunctions.

Figure 5:
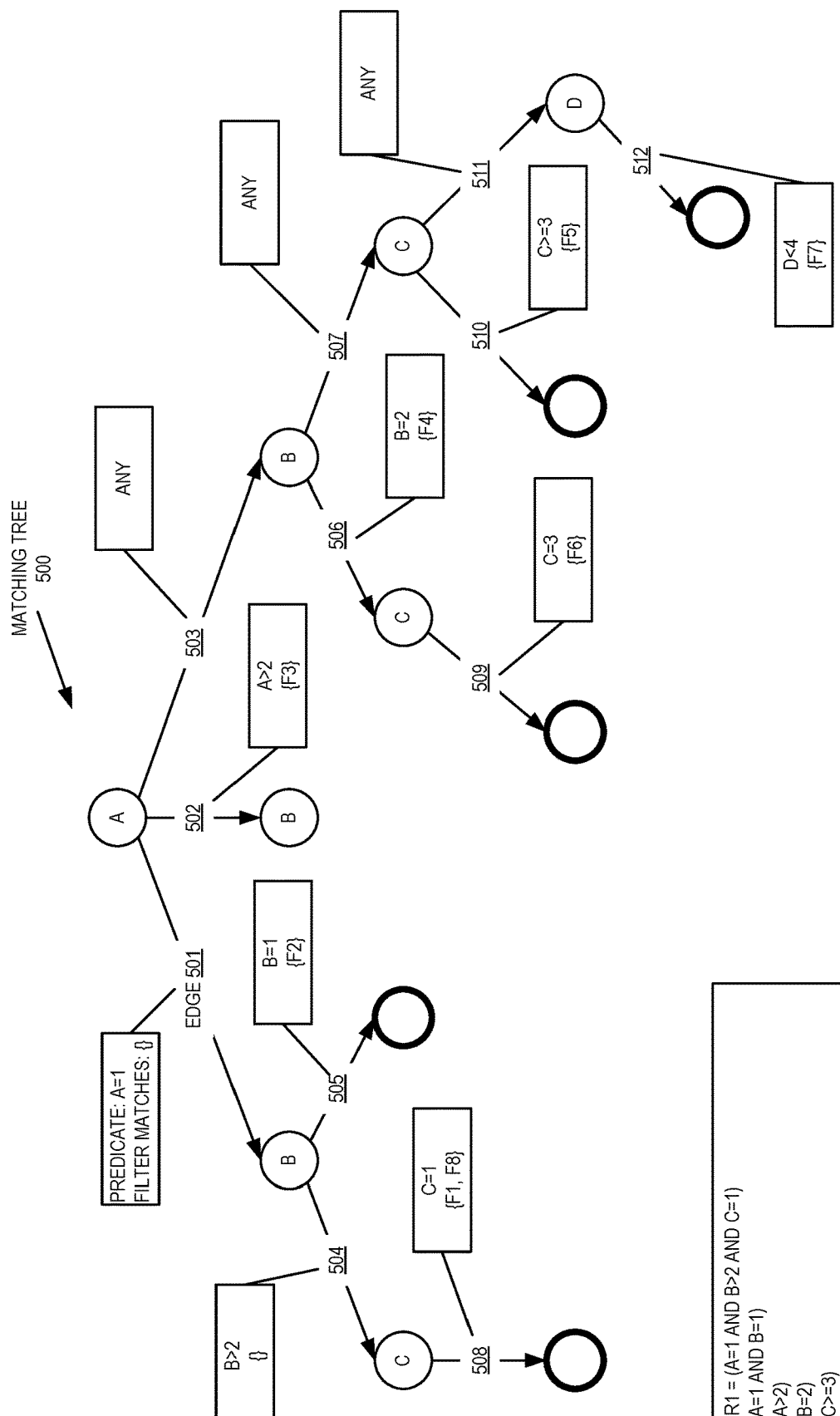
FIG. 5 illustrates a second example matching tree for mapping a source event stream to a response event stream, according to some embodiments.
Figure 6:
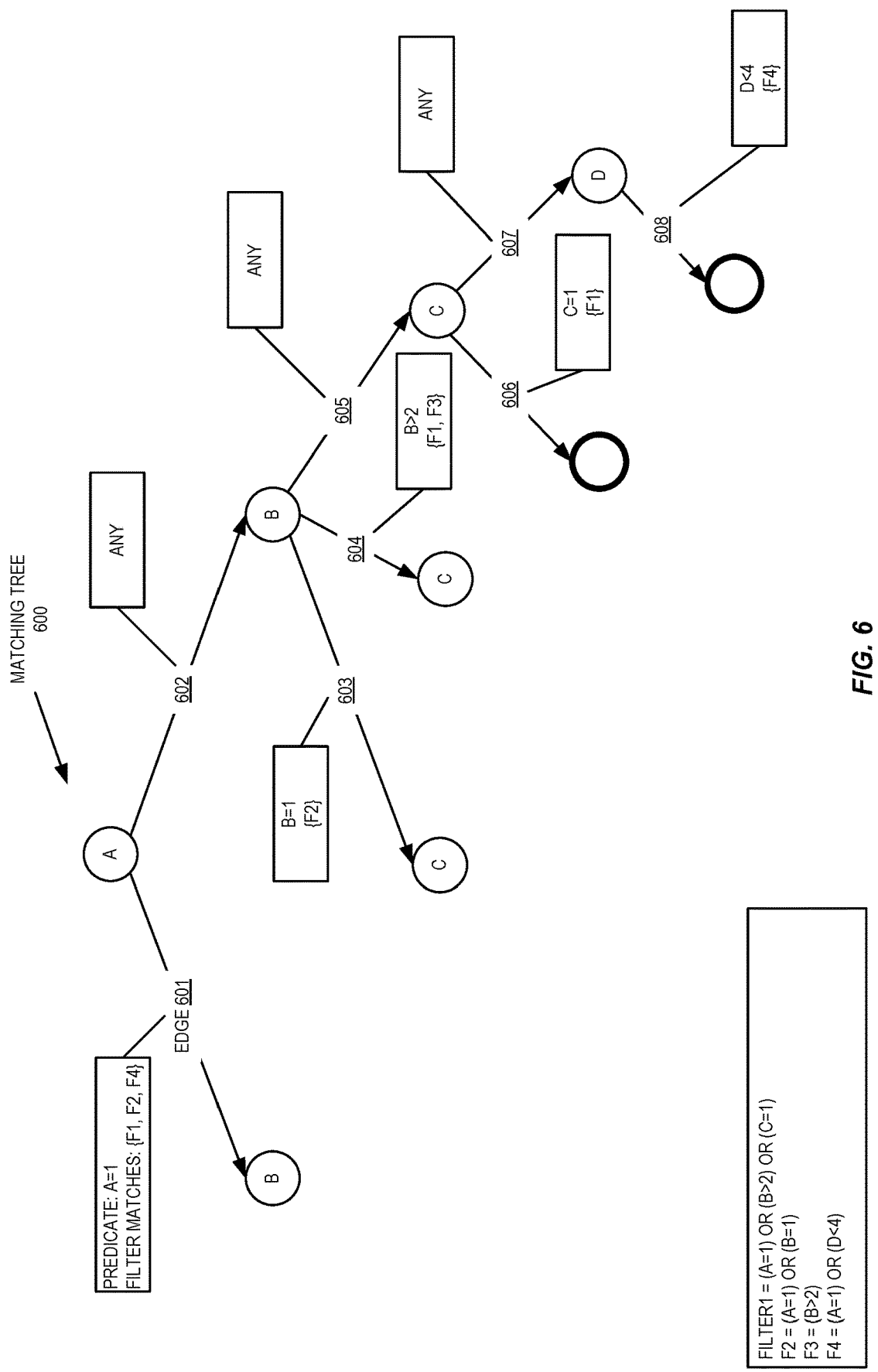
FIG. 6 illustrates a third example matching tree for mapping a source event stream to a response event stream, according to some embodiments.
Figure 7:
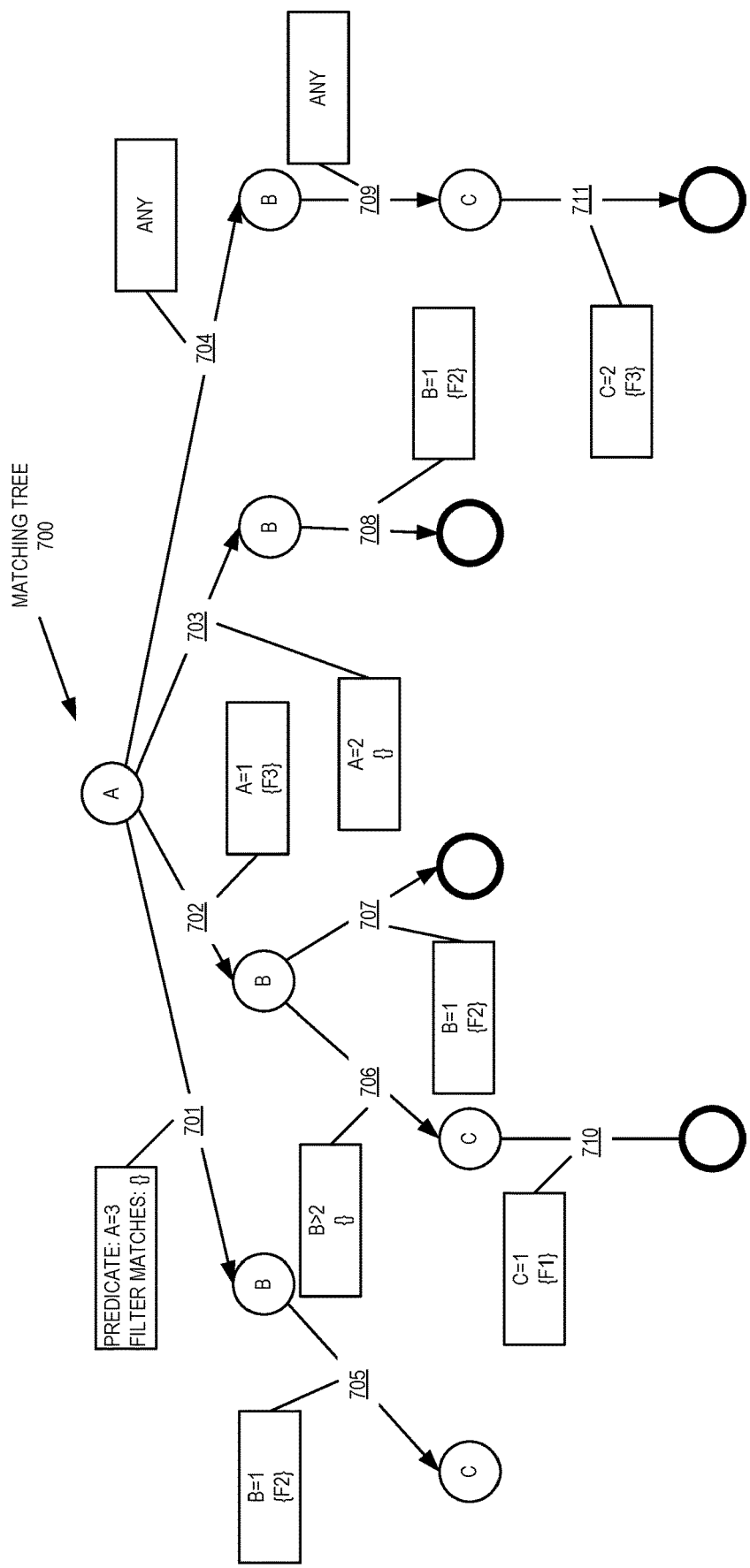
FIG. 7 illustrates a fourth example matching tree for mapping a source event stream to a response event stream, according to some embodiments.

Some examples of matching an example event to a matching tree will now be provided with respect to FIG. 5, FIG. 6, and FIG. 7. The examples use the following example event with the following fields and values:

```
00: E={
01: A=1,
02: B=2,
03: C=4,
04: D=3
05: }
```

FIG. 5 illustrates a second example matching tree for mapping a source event stream to a response event stream, according to some embodiments. To match subscriptions to event E, the predicates represented by edges 501, 504, 505, 502, 503, 506, 509, 507, 510, 511, and 512 are evaluated and the event E can be provided in response event streams of subscriptions associated with filters F4, F5, and F7. The predicate of edge 508 is not evaluated because the predicate (B>2) represented by edge 504 is not satisfied by event E. The event E does not match filters F1, F2, F3, F6, or F8.

FIG. 6 illustrates a third example matching tree for mapping a source event stream to a response event stream, according to some embodiments. To match subscriptions to event E, the predicates of edges 601, 602, 603, 604, 605, 606, 607, and 608 are evaluated. The event E can be provided in response event streams of subscriptions associated with filters F1, F2, and F4. Event E does not satisfy filter F3.

FIG. 7 illustrates a fourth example matching tree for mapping a source event stream to a response event stream, according to some embodiments. The match subscriptions to event E, the predicates of edges 701, 702, 703, 704, 706, 707, 709, and 711 are evaluated. The event E can be provided in response event streams of subscriptions associated with the filter F3. The predicate of edge 705 is not evaluated because the predicate of edge 701 is not satisfied by event E. The predicate of edge 708 is not evaluated because the predicate of edge 703 is not satisfied by event E. The predicate of edge 710 is not evaluated because the predicate of edge 706 is not satisfied by event E. The filters F1 and F2 are not matched by event E.

As an alternative to a matching tree-based algorithm, a persistent function for mapping a source event stream to a response event stream can be implemented by a counting-based algorithm. A counting-based algorithm maintains a counter for each server-specified filter in a set of server-specified filters. For example, the set of server-specified filters can be all those for a particular subscription field (e.g., "onCreateTicket"). The counter records the number of predicates of the server-specified filter that match an event (e.g., event E). For an event from the source event stream, the counting-based algorithm iterates over one or more fields of the event. For each field of the event, the number of predicates of each server-specified filter in the set of server-specified filters that is matched by the field is determined. After iterating through the one or more fields of the event, a determining is made of which, if any, of the set of server-specified filters having all predicates of the filter matched by the event. If the server-specified filter is a disjunction of conjunction or contains IN predicates after normalizing, then the counting-based algorithm can be performed for each separate conjunction.

The counting-based algorithm can have two phases: a pre-processing phase and a matching phrase. To better understand the counting-based algorithm, consider the following set of filters.

| F1 | A = 1 AND B > 2 AND C = 1 |
| F2 | A = 1 AND B = 1 |
| F3 | A > 2 |

-continued

| | |
|---|---|
| F4 | B = 2 |
| F5 | C >= 3 |
| F6 | B = 2 AND C = 3 |
| F7 | D < 4 |
| F8 | B > 2 AND C = 1 AND A = 1 |

During the pre-processing phase, the unique fields and the unique predicates in the set of filters are identified. In the above example, the unique fields are A, B, C, and D. The unique predicates are: A=1; B>2; C=1; B=1; A>2; B=2; C>=3; C=3; D<4.

Three separate mappings are constructed during the pre-processing phase: one mapping (field-predicate mapping) is from the unique fields to the unique predicates that contain those fields, a second mapping (predicate-filter mapping) is from the unique predicates to the filters in the set of filters that contain those predicates, and a third mapping (filter-predicate count mapping) counts the number of predicates in each filter.

Returning to the above example, the field-predicate mapping can be as follows:

| Field | Predicates |
|---|---|
| A | A = 1; A > 2 |
| B | B > 2; B = 1; B = 2 |
| C | C = 1; C >= 3; C = 3 |
| D | D < 4 |

The predicate-filter mapping for the example can be as follows:

| Predicate | Filter |
|---|---|
| A = 1 | F1; F2; F8 |
| B > 2 | F1; F8 |
| C = 1 | F1; F8 |
| B = 1 | F2 |
| A > 2 | F3 |
| B = 2 | F4; F6 |
| C >= 3 | F5 |
| C = 3 | F6 |
| D < 4 | F7 |

And the filter-predicate count mapping can be as follows:

| Filter | Total Predicate Count |
|---|---|
| F1 | 3 |
| F2 | 2 |
| F3 | 1 |
| F4 | 1 |
| F5 | 1 |
| F6 | 1 |
| F7 | 1 |
| F8 | 3 |

For the matching phase, the counting-based algorithm can iterate over each field of an event or a selected set of fields of the event from the source event stream. For each field of the event that matches a predicate of a filter, a "match" counter for the filter and the event is incremented. The match counter can be initialized to zero at the start of the matching phase for the event. Filters having a match counter for the event that equals the total number of predicates for the filter in the filter-predicate count mapping are identified as matching the event.

As an illustrative non-limiting example of the matching phase of the counting-based algorithm, consider again the following example event E:
00: E={
01: A=1,
02: B=2,
03: C=4,
04: D=3
05: }

For field A of event E, predicates A=1 and A>2 are evaluated according to the field-predicate mapping. The field A of event E matches just one of the predicate A=1. According to the predicate-filter mapping, predicate A=1 appears in filters F1, F2, and F8. Therefore, the match counter for each of those filters and event E is incremented by one.

For field B of event E, predicates B>2, B=1, and B=2 are evaluated according to the field-predicate mapping. The field B of event E matches just one of the predicate B=2. According to the predicate-filter mapping, predicate B=2 appears in filters F4 and F6. Therefore, the match counter for each of those filters and event E is incremented by one.

For field C of event E, predicates C=1, C>=3, and C=3 are evaluated according to the field-predicate mapping. The field C of event E matches just one of the predicate C>=3. According to the predicate-filter mapping, predicate C<=3 appears in filter F5. Therefore, the match counter for filter F5 and event E is incremented by one.

For field D of event E, predicate D<4 is evaluated according to the field-predicate mapping. The field D of event E matches this predicate. According to the predicate-filter mapping, predicate D<4 appears in filter F7. Therefore, the match counter for filter F7 and event E is incremented by one.

After iterating over fields A, B, C, and D of event E, the following are the match counts for the example set of filters F1 through F8:

| FILTER | PREDICATE MATCH COUNT |
|---|---|
| F1 | 1 |
| F2 | 1 |
| F3 | 0 |
| F4 | 1 |
| F5 | 1 |
| F6 | 1 |
| F7 | 1 |
| F8 | 1 |

The filters with a match count for event E that equals the total number of predicates of the filter according to the filter/predicate count mapping are F4, F5, and F7. As such, subscription clients for which filter F4, F5, or F7 are specified can be notified of event E in their respective response event streams.

In some embodiments, the matching tree algorithm is used. The matching time of the matching tree can be faster in many cases than the counting-based algorithm. A strict subset of the predicates of a filter may only need to be evaluated in many cases with the matching tree algorithm. In contrast, with the counting-based algorithm all predicates of a filter are evaluated during matching.

Figure 8:
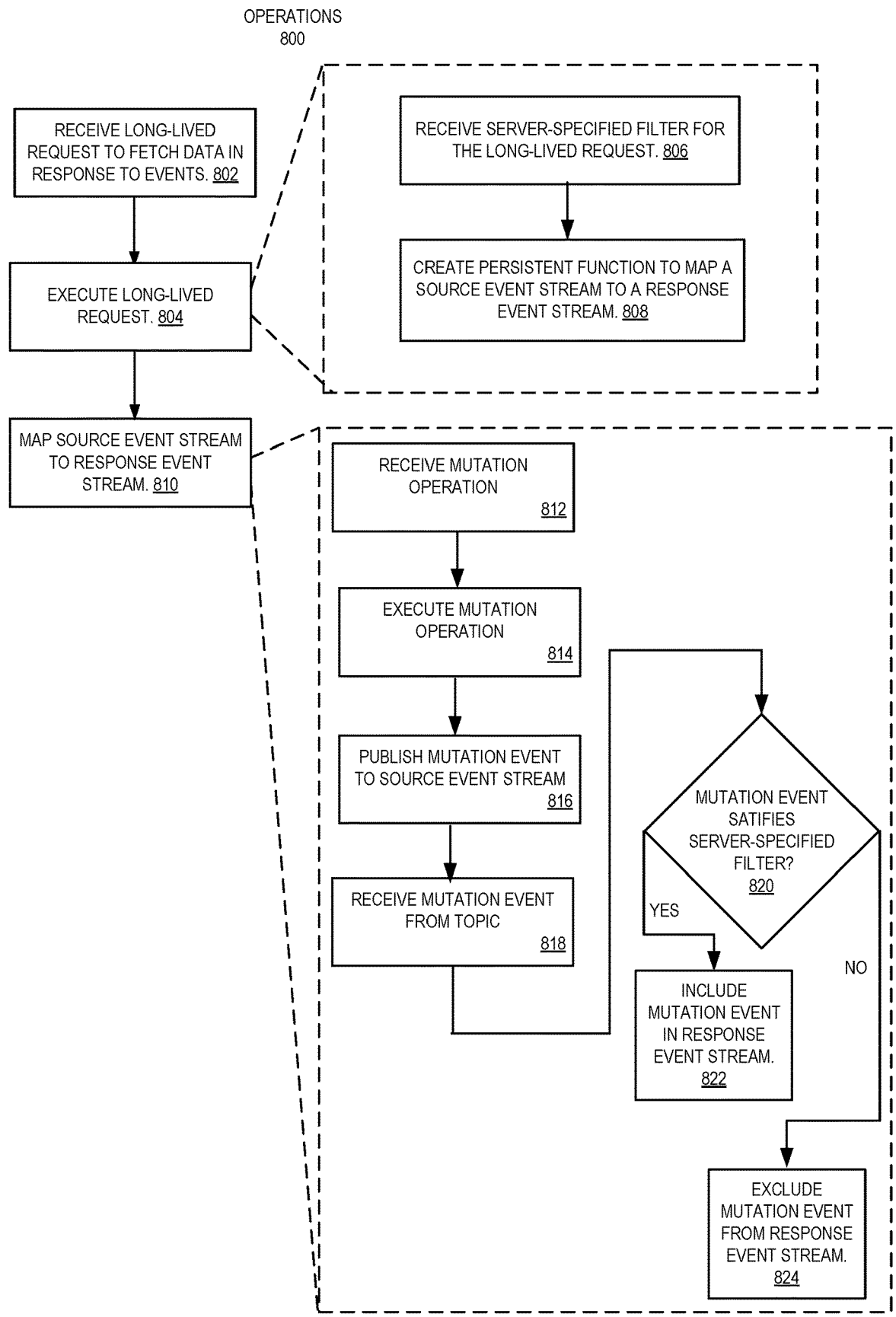
FIG. 8 is a flow diagram illustrating operations of a method for a server-specified filter for a long-lived request to fetch data in response to events, according to some embodiments.

Turning now to FIG. 8, it depicts operations 800 of a method for server-specified filters for long-lived requests in response to events, according to some embodiments. The operations 800 can be performed, for example, by API service 104 of FIG. 1 and FIG. 2 executing on or otherwise using the features of computer system 1000 for purposes of illustration. It is appreciated that operations 800 can be altered to modify the order of operations and to include additional operations.

At operation 802, a long-lived request to fetch data in response to events is received. The request can be sent from a subscription client. For example, the long-lived request can be a GraphQL request specifying a subscription operation. The subscription operation can reference a subscription field in a selection set. The reference to the subscription field can pass one or more arguments for one or more parameters allowed by an API query language schema that defined a subscription type. The subscription operation can also specify a set of one or more fields of matching events that are to be returned in a response event stream.

At operation 804, the long-lived request is executed. Execution of long-lived request includes performance of operations 806 and 808.

At operation 806, a server-specified filter for the long-lived request is received. For example, a resolver function bound to the subscription field by the API query language schema can be executed. Execution of the resolver function can include receipt of the server-specified filter. The resolver function can be programmed or configured to create the server-specified filter based on the one or more arguments passed in the reference to the subscription field in the subscription operation, based on data fetched from one or more data sources, or based on logic (e.g., hard-coded logic) of the resolver function.

At operation 808, a persistent function for mapping a source event stream to a response event stream is created. For example, a matching tree can be created for the subscription field and the server-specified filter added to the matching tree in a pre-processing phase. Alternatively, if the matching tree for the subscription field is already created, then the server-specified can be added to the existing matching in a pre-processing phase. In addition, a channel at a pub/sub service that provides the source event stream can be subscribed to.

At operation 810, the source event stream is mapped to the response event stream according to the persistent function. Operation 810 can involve sub-operations 812, 814, 816, 818, 820, 822, and 824.

At operation 812, a mutation operation is received. For example, a GraphQL request specifying a GraphQL mutation operation can be received. The request can be sent from a mutation client.

At operation 814, the mutation operation is executed. Execution of the mutation operation can involve updating data in one or more data sources and receiving a mutation event that reflects the result of the updating. The mutation event can be composed of a set of one or more fields and corresponding values.

At operation 816, the mutation event is published to the channel at the pub/sub service that provides the source event stream. The channel can correspond to an application API, the subscription field, or the mutation field of the mutation operation, for example.

At operation 818, the mutation event is received by a subscriber to the channel. The subscriber can be a long-lived connection service, for example.

At operation 820, the persistent function is executed to determine if the mutation event satisfies the server-specified filter. For example, the persistent function can use a matching tree algorithm or a counting-based algorithm to determine whether the mutation event satisfies the server-specified filter. If the mutation event does satisfy the server-specified filter, then, at operation 822, the mutation event or a version thereof can be included in the response event stream sent to the subscription client. On the other hand, if the mutation event does not satisfy the server-specified filter, then at operation 824, the mutation event is excluded from the response event stream. A version of the mutation event that can be included in the response event stream can be one that includes fields of the mutation event requested in the subscription operation.

Operations 800 can be repeated continuously. For example, operations 802, 804, 806, and 808 can be repeated for another long-lived request to fetch data in response to events (i.e., for another subscription request). And operations 810, 812, 814, 816, 818, 820, and 822 can be repeated for a mutation event that satisfies the server-specified filter specified for the long-lived request.

In some embodiments, server-specified redactions are supported. In particular, certain fields of a mutation event matching a server-specified filter can be removed or redacted before the mutation event is published or sent to the subscription client. For example, it can be desired to redact fields of the mutation event containing personally identifying information (PII) or other sensitive information such as, for example, a social security number field.

In some embodiments, to support subscription redactions, execution service 110 provides an API that allows for the specification of a server-specified redaction filter. The server-specified redaction filter can be specified similar to how a server-specified subscription filter is specified. For example, a resolver function that is executed by execution service 110 in response to a subscription request can specify just a server-specified subscription filter for the request, specify just a server-specified redaction filter for the request, or specify both a server-specified subscription filter and a server-specified redaction filter.

In some embodiments, a server-specified redaction filter is group of one or more predicates on fields of mutation events like a server-specified subscription filter. However, a server-specified redaction filter can be a "blanket" filter on one or more fields of mutation events. For example, a server-specified redaction filter can specify that a social-security number field and associated value us to be redacted from mutation events regardless of the value of the field.

The matching tree algorithm can be used to match server-specified redaction filters to mutation events. Use of a server-specified redaction filter in a persistent function at long-lived connection service 108 to map a source event stream to a response event stream can include associating predicates of the server-specified redaction filter with edges of a matching tree.

Figure 9:
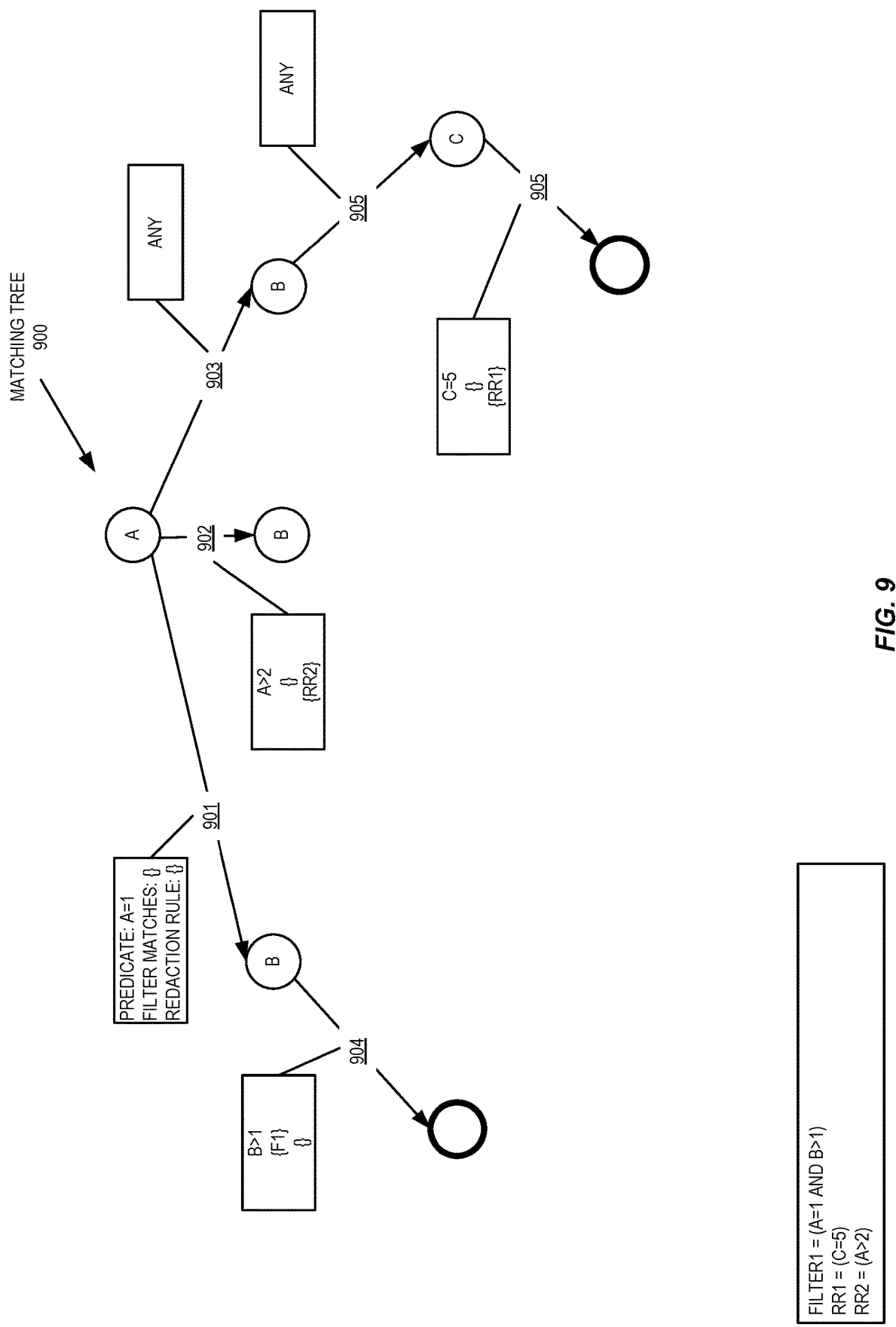
FIG. 9 illustrates an example matching tree for mapping a source event stream to a response event stream, according to some embodiments.

For example, FIG. 9 depicts matching tree 900. Matching tree 900 represents server-specified subscription filter F1 and server-specified redaction filters RR1 and RR2. During the matching phase, a mutation event can be matched to any subscription filters and any redaction filters in the same breadth-first or depth-first traversal of a matching tree.

For example, consider the following mutation event with the specified fields and values from a source event stream:
```
00: E={
01: A=1,
02: B=2,
03: C=5,
04: }
```

Assuming a depth-first traversal, the event E satisfies the predicate of edge 901 because the value of the field A equals 1 and satisfies predicate A=1 of filter F1. However, there are no subscription filters or redaction filters associated with edge 901. Thus, at this point in the traversal, no subscription filters or redaction filters have been determined to match event E.

Continuing the depth-first traversal, the event E satisfies the predicate of edge 904 because the value of the field B equals 2 and satisfies the predicate B>1 of filter F1. Since the predicate of edge 904 is satisfied and there is a subscription filter F1 associated with edge 904, then filter F1 matches event E.

Continuing the depth-first traversal, the event E does not satisfy the predicate of edge 902. Thus, the depth-first traversal continues. Since edge 903 matches ANY, then the traversal proceeds to edge 905. Since edge 905 matches ANY, then the traversal proceeds to edge 906. The event E satisfies the predicate of edge 906 because the value of the field C equals 5 and satisfied the predicate C=5. Since the predicate of edge 906 is satisfied and there is a redaction filter RR1 associated with edge 906, then redaction filter RR1 matches event E.

Thus, at the end of the traversal of tree 900, subscription filter F1 and redaction filter RR1 matches event E but redaction filter RR2 does not match event E. Accordingly, a version of event E will be published to the subscription clients associated with subscription filter F1 that does not include the field C or the value 5 of the field C. In some embodiments, redaction redacts just the value and not the field. Thus, in these embodiments, the version event E published to a subscription client might include the field C but can specify a value of NULL of the like for the value of field C.

Figure 10:
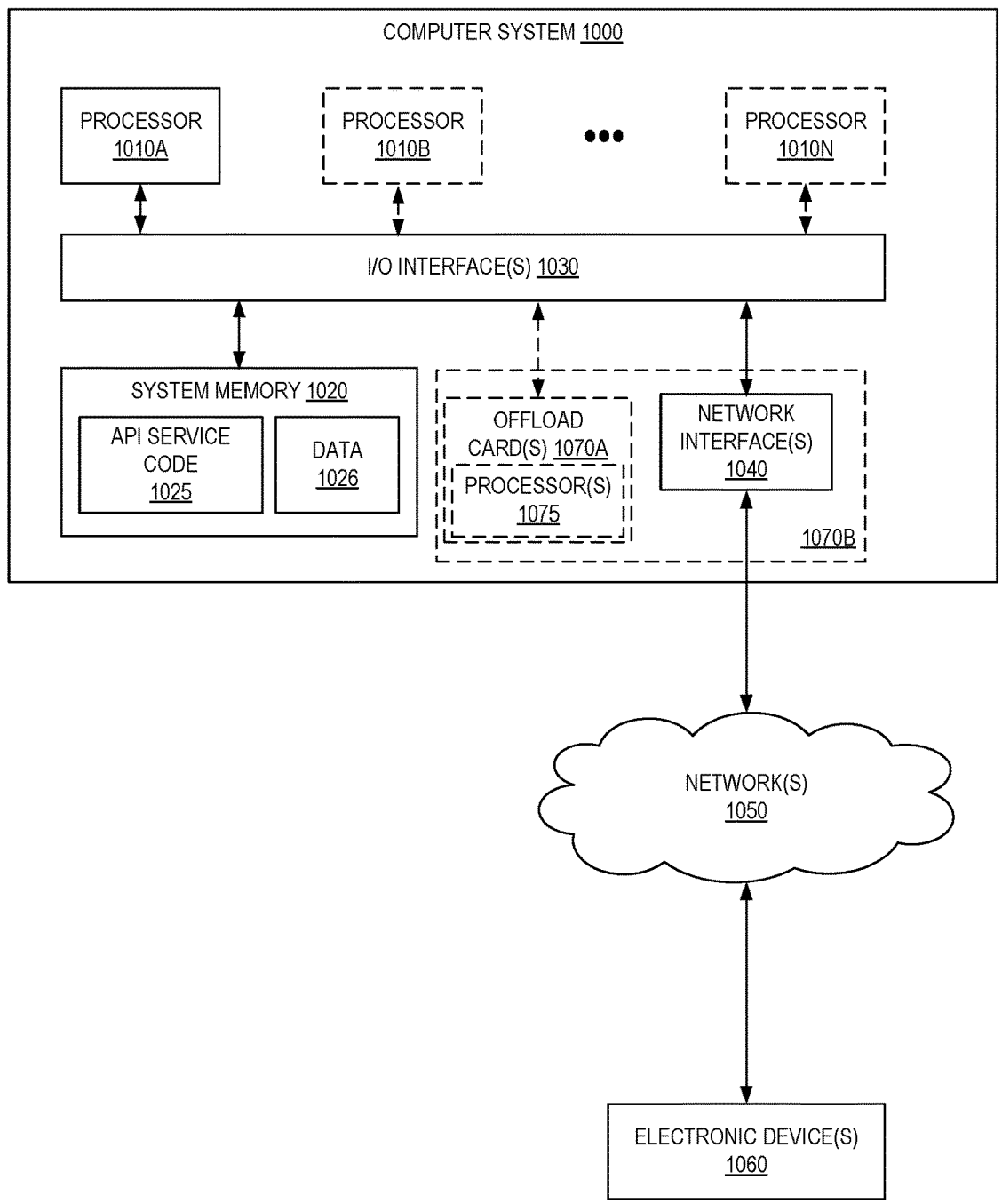
FIG. 10 is a block diagram illustrating an example computer system that can be used in some embodiments.

A system that implements a portion or all the techniques described herein can include a general-purpose computer system. In the illustrated embodiment, the computer system 1000 includes one or more processors 1010 coupled to system memory 1020 via input/output (I/O) interface 1030. System 1000 further includes network interface 1040 coupled to I/O interface 1030. While FIG. 10 shows computer system 1000 as a single computing device, in various embodiments computer system 1000 can include one computing device or any number of computing devices configured to work together as single computer system 1000 as in a distributed, parallel, or clustered computing system arrangement.

Computer system 1000 can be a uniprocessor system including one processor 1010, or a multiprocessor system including several processors 1010 (e.g., two, four, eight, or another suitable number). Processor(s) 1010 can be any suitable processor(s) capable of executing instructions. For example, in various embodiments, processor(s) 1010 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 1010 can commonly, but not necessarily, implement the same ISA.

System memory 1020 can store instructions and data accessible by the processor(s) 1010. In various embodiments, system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as API Service code 1025 (e.g., executable to implement, in whole or in part, the API Service 104) and data 1026.

In some embodiments, I/O interface 1030 can be configured to coordinate I/O traffic between processor(s) 1010, system memory 1020, and any peripheral devices in the device, including network interface 1040 or other peripheral interfaces (not shown). In some embodiments, I/O interface 1030 can perform any necessary protocol, timing, or other data transformations to convert data signals from one component (e.g., system memory 1020) into a format suitable for use by another component (e.g., processor(s) 1010). In some embodiments, I/O interface 1030 can include support for devices attached through various types of peripheral buses, such as a variant of the PERIPHERAL COMPONENT INTERCONNECT (PCI) bus standard or the UNIVERSAL SERIAL BUS (USB) standard, for example. In some embodiments, the function of I/O interface 1030 can be split into two or more separate components, such as a north bridge and a south bridge, for example. Also, in some embodiments, some or all of the functionality of I/O interface 1030, such as an interface to system memory 1020, can be incorporated directly into processor 1010.

Network interface 1040 can be configured to allow data to be exchanged between computer system 1000 and other devices 1060 attached to network(s) 1050, such as other computer systems or devices as illustrated in FIG. 1, for example. In various embodiments, network interface 1040 can support communication via any suitable wired or wireless general data networks, such as types of Ethernet network, for example. Additionally, network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, computer system 1000 includes one or more offload cards 1070A or 1070B (including one or more processors 1075, and possibly including one or more network interfaces 1040) that are connected using I/O interface 1030 (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). For example, in some embodiments computer system 1000 can act as a host electronic device (e.g., operating as part of a hardware virtualization service) that hosts compute resources such as compute instances, and one or more offload cards 1070A or 1070B execute a virtualization manager that can manage compute instances that execute on the host electronic device. As an example, in some embodiments offload card(s) 1070A or 1070B can perform compute instance management operations, such as pausing or un-pausing compute instances, launching or terminating compute instances, performing memory transfer/copying operations, etc. These management operations can, in some embodiments, be performed by offload card(s) 1070A or 1070B in coordination with a hypervisor (e.g., upon a request from a hypervisor) that is executed by other processors 1010A-1010N of computer system 1000. However, in some embodiments the virtualization manager implemented by offload card(s) 1070A or 1070B can accommodate requests from other entities (e.g., from compute instances themselves), and cannot coordinate with (or service) any separate hypervisor.

In some embodiments, system memory 1020 can be one embodiment of a computer-accessible medium configured to store program instructions and data as described above. However, in other embodiments, program instructions or data can be received, sent, or stored upon different types of computer-accessible media. Generally speaking, a computer-accessible medium can include any non-transitory storage media or memory media such as magnetic or optical media, e.g., disk or DVD/CD coupled to computer system 1000 via I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of computer system 1000 as system memory 1020 or another type of memory. Further, a computer-accessible medium can include transmission media or signals such as electrical, electromagnetic, or digital signals, conveyed via a communication medium such as a network or a wireless link, such as can be implemented via network interface 1040.

In the foregoing detailed description, reference is made to embodiments, examples of which are illustrated in the accompanying drawings. Numerous specific details are set forth to provide a thorough understanding of the embodiments. However, it is apparent that some embodiments can be practiced without these specific details. In other instances, well-known elements, features, acts, or operations have not been described in detail so as not to unnecessarily obscure the embodiments.

Bracketed text and blocks with dashed borders (e.g., large dashes, small dashes, dot-dash, or dots) are used herein to illustrate optional aspects that add to some embodiments. However, such notation should not be taken to mean that these are the only options or the only optional aspects, or that blocks with solid borders are not optional in certain embodiments.

Reference numerals with suffix letters (e.g., 1010-1 . . . 1010-N) are used to indicate merely that there can be one or multiple instances of the referenced element, feature, act, or operation, and when there are multiple instances, each does not need to be identical but can instead share some general traits or act in common ways. The particular suffixes used are not meant to imply that a particular amount of the element, feature, act, or operation exists unless specifically indicated to the contrary. Thus, two elements, features, acts, or operations using the same or different suffix letters might or might not have the same number of instances in various embodiments.

Unless the context clearly indicates otherwise, the term "or" is used in the foregoing specification and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
   receiving a GraphQL request, the GraphQL request comprising a subscription operation, the subscription operation referencing a subscription field within a selection set, the GraphQL request sent by a subscription client;
   receiving a server-specified filter for the subscription operation; wherein the server-specified filter comprises one or more predicates; wherein at least one field, operator, or value of at least one predicate of the one or more predicates originates at a server as opposed to the subscription client;
   executing the subscription operation including creating a persistent function for the subscription field that uses the server-specified filter to map a source event stream to a response event stream for the subscription client;
   mapping the source event stream to the response event stream for the subscription client using the server-specified filter; and
   providing events from the source event stream that are mapped to the response event stream for the subscription client to the subscription client via a bi-directional data communications channel established with the subscription client.

2. The method of claim 1, further comprising:
   receiving the server-specified filter for the subscription operation by executing a resolver function bound to the subscription field of the subscription operation, the resolver function bound to the subscription field by an application program interface (API) query language schema.

3. The method of claim 1, further comprising:
   receiving a GraphQL request comprising a mutation operation from a mutation client;
   executing the mutation operation to yield a mutation event;
   publishing the mutation event to a channel of a publish/subscription service, the channel comprising the source event stream; and
   wherein mapping the source event stream to the response event stream for the subscription client using the server-specified filter comprises:
     receiving the mutation event as a subscriber to the channel,
     determining that the server-specified filter matches the mutation event, and
     including the mutation event or a version of the mutation event in the response event stream for the subscription client.

4. A method comprising:
receiving an application programming interface (API) query language long-lived request to fetch data in response to events; wherein the API query language long-lived request is sent by a subscription client; wherein the API query language long-lived request does not include a client-specified subscription filter or comprises a partially-specified client-specified subscription filter;
receiving a server-specified filter for the API query language long-lived request; wherein the server-specified filter comprises one or more predicates; wherein at least one field, operator, or value of at least one predicate of the one or more predicates originates at a server as opposed to the subscription client;
executing the API query language long-lived request including creating a persistent function that uses the subscription filter to map a source event stream to a response event stream, the response event stream responsive to the API query language long-lived request; and
mapping the source event stream to the response event stream using the server-specified filter.

5. The method of claim 4, further comprising:
receiving the server-specified filter for the application programming interface (API) query language long-lived request by executing a resolver function bound to a subscription field of the API query language long-lived request, the resolver function bound to the subscription field by an application program interface (API) query language schema.

6. The method of claim 5, wherein the server-specified filter is statically defined by the resolver function.

7. The method of claim 4, further comprising:
fetching a set of data from a data source; and
creating the server-specified filter based on the set of data fetched from a data source.

8. The method of claim 4, further comprising:
receiving an event from the source event stream; and
determining to include a version of the event in the response event stream based on using a matching tree to match the server-specified filter to the event.

9. The method of claim 4, further comprising:
receiving a set of one or more arguments in the application programming interface (API) query language long-lived request; and
creating the server-specified filter based on the set of one or more arguments.

10. The method of claim 4, wherein creating the persistent function that uses the subscription filter to map the source event stream to the response event stream is based on subscribing to a channel of a publish/subscription service that provides the source event stream.

11. The method of claim 4, wherein creating the persistent function that uses the subscription filter to map the source event stream to the response event stream is based on updating a matching tree for a subscription field of the application programming interface (API) query language long-lived request to represent the server-specified filter.

12. The method of claim 4, wherein mapping the source event stream to the response event stream using the server-specified filter is based on:
using the persistent function to determine a set of one or more events from the source event stream that match the sever-specified filter; and
for each event of the set of one or more events, sending the event or a version of the event to the subscription client via a bi-directional data communications channel established with the subscription client.

13. The method of claim 4, further comprising:
obtaining an identifier of an authenticated user associated with the application programming interface (API) query language long-lived request; and
creating the server-specified filter using the identifier of the authenticated user.

14. The method of claim 4, further comprising:
receiving an application programming interface (API) query language mutation request;
executing the API query language mutation request to yield a mutation event;
publishing the mutation event to a channel of a publish/subscription service, the channel comprising the source event stream; and
wherein mapping the source event stream to the response event stream using the server-specified filter comprises:
receiving the mutation event as a subscriber to the channel,
determining that the server-specified filter matches the mutation event, and
including the mutation event or a version of the mutation event in the response event stream.

15. The method of claim 4, further comprising:
receiving a server-specified redaction filter for the application programming interface (API) query language long-lived request;
using the server-specified redaction filter to map the source event stream to the response event stream including:
determining that the server-specified redaction filter matches a mutation event from the source event stream,
generating a redacted version of the mutation event that redacts a particular field of the mutation event, wherein the particular field of the mutation event pertains to the server-specified redaction filter, and
including the redacted version of the mutation event in the response event stream.

16. A system comprising:
a first one or more computing devices to implement a long-lived connection service, the long-lived connection service comprising instructions which when executed cause the long-lived connection service to:
receive an application programming interface (API) query language long-lived request to fetch data in response to events, wherein the API query language long-lived request is to be sent by a subscription client, wherein the API query language long-lived request is to not comprise a client-specified subscription filter or is to comprise a partially-specified client-specified subscription filter;
create a persistent function that is programmed or configured to use a server-specified filter to map a source event stream to a response event stream, wherein the server-specified filter is to comprise one or more predicates, wherein at least one field, operator, or value of at least one predicate of the one or more predicates is to originate at a server as opposed to the subscription client, and
map the source event stream to the response event stream using the server-specified filter; and
a second one or more computing devices to implement an application programming interface query language execution service, the execution service comprising instructions which when executed cause the execution service to execute the application programming interface (API) query language long-lived request including receive the server-specified filter.

17. The system of claim 16, wherein:
the execution service further comprises instructions which when executed cause the execution service to:
  receive a mutation operation,
  execute the application programming interface (API) query language mutation request to yield a mutation event,
  publish the mutation event to a channel of a publish/subscription service, the channel comprising the source event stream; and
the long-lived connection service further comprises instructions which when executed cause the long-lived connection to:
  subscribe to the channel,
  receive the mutation event as a subscriber to the channel,
  determine that the server-specified filter matches the mutation event, and
  include the mutation event or a version of the mutation event in the response event stream.

18. The system of claim 16, wherein:
the execution service further comprises instructions which when executed cause the execution service to:
  receive the server-specified filter by executing a resolver function bound to a subscription field, the subscription field to be referenced in a selection set of the application programming interface (API) query language long-lived request, the resolver function to be bound to the subscription field by an application programming interface (API) query language schema.

19. The system of claim 16, wherein:
the long-lived connection service further comprises instructions which when executed cause the long-lived execution service to:
  receive an event from the source event stream, the event to comprises a set of fields and a set of associated values; and
  determine to include the event or a version of the event in the response event stream based on using a matching tree to match the server-specified filter to the event.

20. The system of claim 16, wherein:
the execution service further comprises instructions which when executed cause the execution service to:
receive a set of one or more arguments associated with a subscription field in the application programming interface (API) query language long-lived request; and
create the server-specified filter based on the set of one or more arguments.

* * * * *